(12) United States Patent
Fujiwara et al.

(10) Patent No.: US 11,927,274 B2
(45) Date of Patent: Mar. 12, 2024

(54) ACTUATOR AND FLUID CONTROL DEVICE

(71) Applicant: M-SYSTEM CO., LTD., Osaka (JP)

(72) Inventors: Hiroyuki Fujiwara, Osaka (JP); Takanobu Wahira, Osaka (JP)

(73) Assignee: M-SYSTEM CO., LTD., Osaka (JP)

(*) Notice: Subject to any disclaimer, the term of this patent is extended or adjusted under 35 U.S.C. 154(b) by 32 days.

(21) Appl. No.: 17/621,693

(22) PCT Filed: Oct. 28, 2020

(86) PCT No.: PCT/JP2020/040379
§ 371 (c)(1),
(2) Date: Dec. 22, 2021

(87) PCT Pub. No.: WO2021/106472
PCT Pub. Date: Jun. 3, 2021

(65) Prior Publication Data
US 2022/0349494 A1    Nov. 3, 2022

(30) Foreign Application Priority Data

Nov. 25, 2019  (JP) ................ 2019-212692
Mar. 18, 2020  (JP) ................ 2020-047267

(51) Int. Cl.
*F16K 31/04* (2006.01)
*F16K 3/18* (2006.01)
(Continued)

(52) U.S. Cl.
CPC .............. *F16K 31/04* (2013.01); *F16K 3/188* (2013.01); *F16K 3/207* (2013.01);
(Continued)

(58) Field of Classification Search
CPC ...... F16K 3/188; F16K 3/207; F16K 37/0025; F16K 37/0033; F16K 37/0041; F16K 31/04
See application file for complete search history.

(56) References Cited

U.S. PATENT DOCUMENTS 4,836,497 A    6/1989  Beeson
6,321,780 B1  11/2001  Iwabuchi
(Continued)

FOREIGN PATENT DOCUMENTS

CN    1748072 A    3/2006
CN  101506747 A    8/2009
(Continued)

OTHER PUBLICATIONS

International Preliminary Report on Patentability in International Patent Application No. PCT/JP2020/040379, dated Jun. 9, 2022. 6pp.

*Primary Examiner* — Atif H Chaudry
(74) *Attorney, Agent, or Firm* — HAUPTMAN HAM, LLP

(57) ABSTRACT

The actuator includes a control unit configured to allow a first control capable of driving a drive part with a first driving force and a second control capable of driving the drive part with a second driving force which is stronger than the first driving force, a moving part configured to move in a predetermined direction, an elastic member configured to receive at least one of the first driving force and the second driving force from the drive part and to supply a force for the moving part to move to the moving part, and a detection unit configured to supply a detection signal for detecting a stop of the drive part to the control unit, in which the control unit performs the second control when a stop of the drive part is detected after performing the first control.

11 Claims, 17 Drawing Sheets

(51) Int. Cl.
*F16K 3/20* (2006.01)
*F16K 37/00* (2006.01)
*G05D 3/12* (2006.01)

(52) U.S. Cl.
CPC ...... *F16K 37/0008* (2013.01); *F16K 37/0033* (2013.01); *G05D 3/12* (2013.01)

(56) References Cited

U.S. PATENT DOCUMENTS

| | | | |
|---|---|---|---|
| 8,083,207 B1* | 12/2011 | Wylie | F16K 3/30 251/193 |
| 8,118,276 B2 | 2/2012 | Sanders et al. | |
| 2010/0100294 A1 | 4/2010 | Hirao et al. | |
| 2011/0114860 A1 | 5/2011 | Schade et al. | |
| 2017/0186633 A1* | 6/2017 | Kamiya | H01L 21/67739 |
| 2019/0285176 A1 | 9/2019 | Yoshida et al. | |
| 2020/0166154 A1* | 5/2020 | Eschenmoser | F16K 3/18 |

FOREIGN PATENT DOCUMENTS

| | | | |
|---|---|---|---|
| CN | 101606002 A | 12/2009 | |
| CN | 102203475 A | 9/2011 | |
| CN | 107939981 A | 4/2018 | |
| CN | 108463619 A | 8/2018 | |
| EP | 3309436 A1 | 4/2018 | |
| EP | 3409981 A1 | 12/2018 | |
| GB | 2041497 A * | 9/1980 | ............. F16K 3/188 |
| JP | H198777 A | 4/1989 | |
| JP | 20014062 A | 1/2001 | |
| JP | 2002168361 A | 6/2002 | |
| JP | 2005140262 A | 6/2005 | |
| JP | 2011105139 A | 6/2011 | |
| JP | 2014142005 A | 8/2014 | |
| JP | 2019027408 A | 2/2019 | |
| WO | 2008096438 A1 | 8/2008 | |

* cited by examiner

*Fig.7*

| STEP1 | DEVICE INSTALLATION |
|---|---|
| STEP2 | PREDETERMINED SETTING USING OPERATION UNIT B31 |
| STEP3 | PUSH SW1 (START OF FIRST CONTROL)<br>DRIVE WITH FIRST DRIVING FORCE (WEAK FORCE) |
| STEP4 | DETECT STOP OF DRIVE PART 50 |
| STEP5 | STORE FIRST REFERENCE POSITION |
| STEP6 | DRIVE WITH DRIVING FORCE F2 (STRONG FORCE)<br>(START OF SECOND CONTROL) |
| STEP7 | DETECT THAT SECOND CONTROL END CONDITION IS SATISFIED |
| STEP8 | STORE SECOND REFERENCE POSITION |
| STEP9 | START OF NORMAL CONTROL |

Fig. 13

| | DETAIL OF FIRST COMMUNICATION | AUTO SETUP | AXIAL OPERATION |
|---|---|---|---|
| NON-MANUAL OPERATION MODE — FIRST COMMUNICATION MODE (Modbus) | MONITOR | | |
| | AXIAL OPERATION | FOLLOW FIRST COMMUNICATION | FOLLOW FIRST COMMUNICATION |
| | SETTING | | |
| NON-MANUAL OPERATION MODE — SECOND COMMUNICATION MODE (4~20mA) | MONITOR | | |
| | AXIAL OPERATION | FOLLOW FIRST COMMUNICATION | FOLLOW SECOND COMMUNICATION |
| | SETTING | | |
| MANUAL OPERATION MODE | | FOLLOW AUTO SETUP BUTTON 375 AND OPERATION UNIT 310 | FOLLOW DRIVE BUTTON 378a AND DRIVE BUTTON 378b |

Fig. 17

| | | | | |
|---|---|---|---|---|
| DATE [YEAR/MONTH/DAY] | 2020/01/15 | 2020/01/15 | ... | 2020/01/14 |
| TIME [HOUR/MINUTE/SECOND] | 08/17/00 | 08/16/00 | | 08/16/00 |
| INTEGRATED ENERGIZATION TIME [hour] | 2560 | 2560 | | 2551 |
| INTEGRATED OPERATION TIME [hour] | 1234 | 1234 | | 1225 |
| INTEGRATED OPERATION DISTANCE [m] | 253 | 253 | | 252 |
| NUMBER OF TIMES OF MOTOR START [TIMES] | 705 | 705 | | 700 |
| NUMBER OF TIMES OF MOTOR REVERSAL [TIMES] | 120 | 120 | | 118 |
| NUMBER OF TIMES OF MOTOR RETRY [TIMES] | 2 | 2 | | 2 |
| OPERATION RATIO OF EVERY 1 MINUTE [%] | 60 | 60 | | 60 |
| NUMBER OF TIMES OF EXCESSIVELY FREQUENT OPERATIONS [TIMES] | 5 | 5 | | 5 |
| RATIO OF OPENING DEGREE LESS THAN 25% [%] | 95 | 95 | | 95 |
| RATIO OF OPENING DEGREE OF 25% TO 50% [%] | 0 | 0 | | 0 |
| RATIO OF OPENING DEGREE OF 50% TO 75% [%] | 0 | 0 | | 0 |
| RATIO OF OPENING DEGREE OF 75% OR MORE [%] | 5 | 5 | | 5 |
| LOCK INFORMATION [0-2] | 0 | 0 | | 0 |

ACTUATOR AND FLUID CONTROL DEVICE

RELATED APPLICATIONS

The present application is National Phase of International Application Number PCT/JP2020/040379, filed Oct. 28, 2020, and claims priority based on Japanese Patent Applications No. 2019-212692, filed Nov. 25, 2019 and No. 2020-047267, filed Mar. 18, 2020.

TECHNICAL FIELD

The present invention relates to an actuator and a fluid control device.

BACKGROUND ART

Patent Literature 1 describes a stepping motor valve including a valve body 3 supported at a balanced position to be mutually movable in an axial direction by springs 8 and 8' and washers 9 and 9'. Patent Literature 1 describes that the valve body 3 normally rotates together with a rotor 6 and that the rotor 6 can further rotate while rotation of the valve body 3 is stopped when friction between a valve body and a valve seat increases.

CITATION LIST

Patent Literature

[Patent Literature 1] Japanese Unexamined Patent Publication No. H01-098777

SUMMARY OF INVENTION

Technical Problem

A problem to be solved is to provide an actuator and a fluid control device in which a suitable control can be realized.

Solution to Problem

An actuator according to a first aspect of the present invention includes a control unit configured to allow a first control capable of driving a drive part with a first driving force and a second control capable of driving the drive part with a second driving force which is stronger than the first driving force, a moving part configured to move in a predetermined direction, an elastic member configured to receive at least one of the first driving force and the second driving force from the drive part and to supply a force for the moving part to move to the moving part, and a detection unit configured to supply a detection signal for detecting a stop of the drive part to the control unit, in which the control unit performs the second control when a stop of the drive part is detected after performing the first control.

Advantageous Effects of Invention

According to the present invention, it is possible to provide an actuator and a fluid control device in which a suitable control can be realized.

BRIEF DESCRIPTION OF DRAWINGS

FIG. 7 is a view for explaining an operation of the fluid control device of the first embodiment.

FIG. 13 is a view for explaining an operation of the fluid control device of the third embodiment.

FIG. 17 is a view for explaining information stored in a storage unit of a fluid control device of a fourth embodiment.

DESCRIPTION OF EMBODIMENTS

First Embodiment

Figure 1:
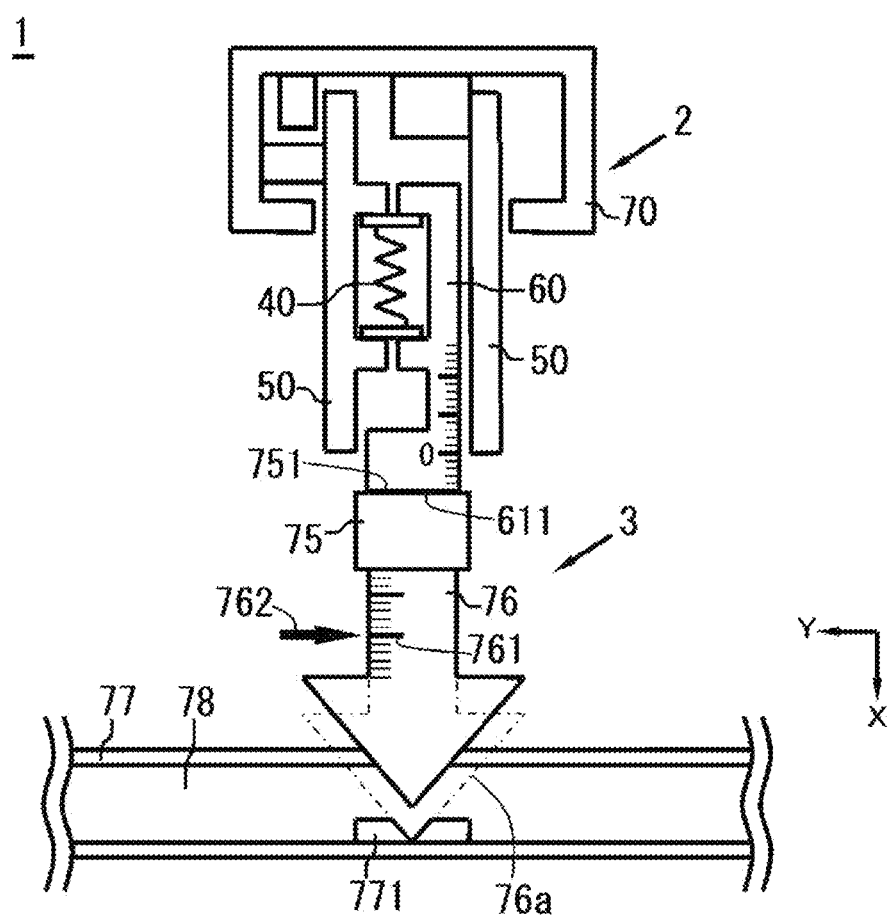
FIG. 1 is a view for explaining a fluid control device of a first embodiment.
Figure 2:
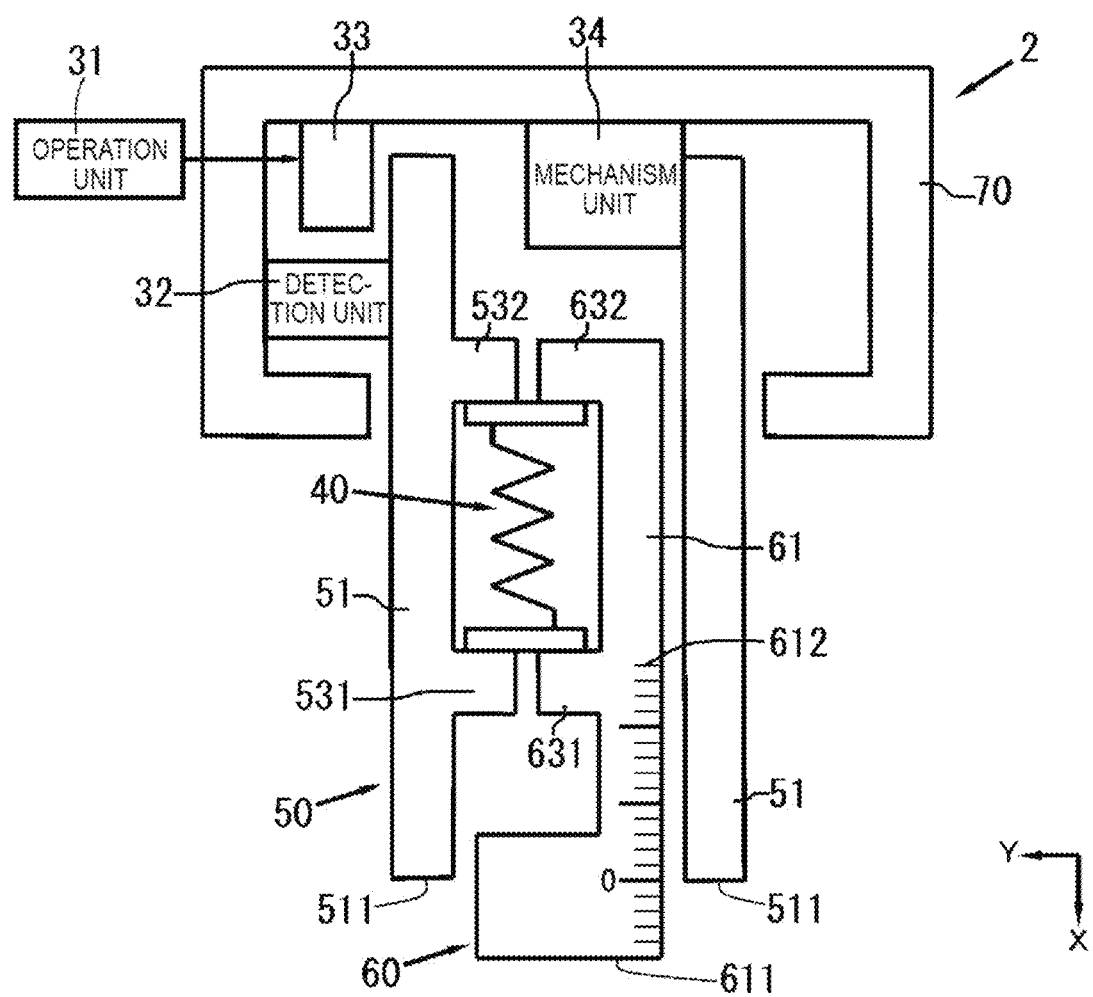
FIG. 2 is a view for explaining an actuator of the first embodiment.
Figure 3:
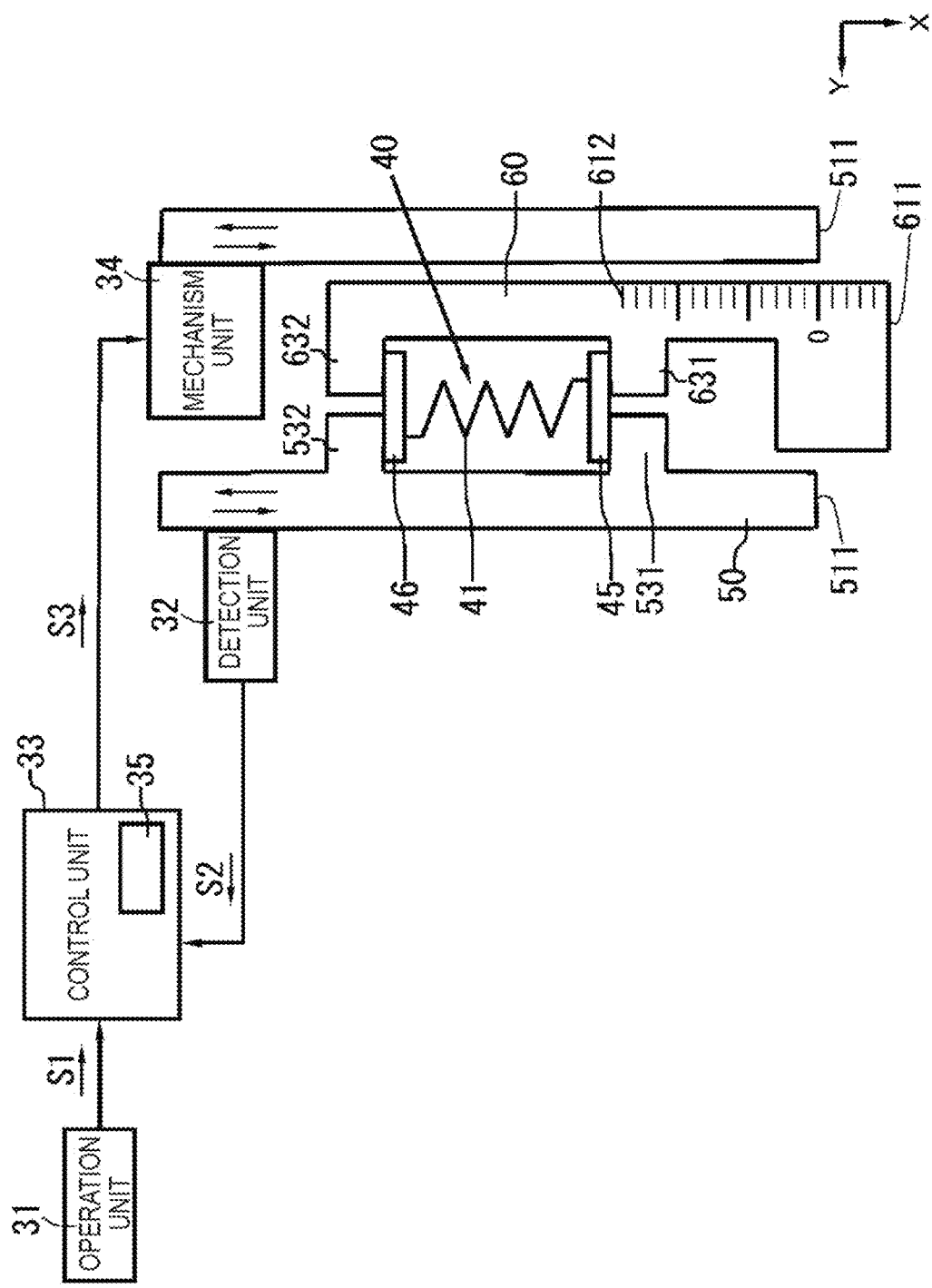
FIG. 3 is a view for explaining a circuit of the actuator of the first embodiment.

FIG. 1 is a view for explaining a fluid control device of a first embodiment, FIG. 2 is a view for explaining an actuator of the first embodiment, and FIG. 3 is a view for explaining a circuit of the actuator of the first embodiment.

In FIG. 1, a fluid control device 1 is a device that controls a flow rate of a fluid such as a liquid, such as water or oil, and powders. The fluid control device 1 includes an actuator 2 and a valve device 3.

The actuator 2 is, for example, an electric actuator. The actuator 2 includes a case 70, an elastic part 40, a drive part 50, and a moving part (drive shaft) 60.

The valve device 3 includes a connection part 75 connected to the actuator 2, a valve body 76 connected to the connection part 75, a scale 761, a marker 762, and a pipe part 77 through which a fluid 78 flows. A contact part 771 is provided on a +X direction side of the pipe part 77.

The fluid control device 1 moves an end portion 611 of the actuator 2 in the +X direction or a −X direction by driving the actuator 2. When the end portion 611 of the actuator 2 moves in the +X direction or the −X direction, the connection part 75 and the valve body 76 of the valve device 3 also move in the +X direction or the −X direction.

The scale 761 is provided on a side surface of the valve body 76 in the X direction. The marker 762 is provided to face the scale 761 so that a relative position with respect to the pipe part 77 does not change. Therefore, a user can ascertain a position of the valve body 76 in the X direction by reading the scale 761 corresponding to the marker 762.

In opening direction control of the valve device 3, the actuator 2 moves the end portion 611 in the −X direction to move the valve body 76 in the −X direction. Thereby, a flow path of the pipe part 77 becomes wider, and a flow rate of the fluid 78 flowing through the valve device 3 increases.

In closing direction control of the valve device 3, the actuator 2 moves the end portion 611 in the +X direction to move the valve body 76 in the +X direction. Thereby, the flow path of the pipe part 77 is narrowed, and the flow rate of the fluid 78 flowing through the valve device 3 reduces. The fluid control device 1 can move the actuator 2 in the +X direction until the valve body 76 moves to a position of 76a and the valve body 76 comes into contact with the contact part 771 of the pipe part 77.

Next, a configuration of the actuator 2 will be described in detail with reference to FIGS. 2 and 3.

In FIGS. 2 and 3, the actuator 2 includes the case 70, the elastic part 40, the drive part 50, the moving part (drive shaft) 60, an operation unit 31, a detection unit 32, a control unit 33, and a mechanism unit 34. In FIG. 2, the case 70 houses a circuit such as the control unit 33, the mechanism unit 34, a part of the drive part 50, and the like.

In FIGS. 2 and 3, the operation unit 31 is provided, for example, outside the case 70, and includes a plurality of operation buttons (not illustrated) that can be operated by the user and an input unit to which an external control signal is supplied from an external device (not illustrated). The operation unit 31 outputs an operation signal S1 according to an operation of the operation buttons by the user or an external control signal.

The detection unit 32 is a sensor for detecting, for example, an operation (drive), a stop, or the like of the drive part 50. The detection unit 32 is a position detection sensor such as, for example, a potentiometer or an encoder. The detection unit 32 may be a sensor detecting linear movement or a sensor detecting rotation. In the present embodiment, the detection unit 32 is a potentiometer that detects linear movement. The detection unit 32 is fixed to the case 70, detects movement of the drive part 50 by using a brush (not illustrated) that slides on the drive part 50, and outputs a detection signal S2. The detection signal S2 is stored in a storage unit 35 of the control unit 33.

The control unit 33 includes, for example, a microcomputer (not illustrated) and the storage unit 35. The control unit 33 determines (detects) whether or not the drive part 50 has stopped on the basis of the detection signal S2. The control unit 33 performs a calculation using the operation signal S1 output from the operation unit 31, the detection signal S2 output from the detection unit 32, and information stored in the storage unit 35, and outputs a control signal S3. In the present embodiment, the control unit 33 performs a first control, a second control, and a normal control to be described later.

The mechanism unit 34 includes a motor (not illustrated) and a cam mechanism (not illustrated). The motor may be, for example, a rotating motor or a motor that is linearly driven. A DC motor, an AC motor, a stepping motor, an ultrasonic motor, or the like can be used for the motor. For example, in the present embodiment, a stepping motor is used to realize high accuracy and high torque.

The cam mechanism may employ any configuration. For example, a cam mechanism converting between a rotational drive and a linear drive, a cam mechanism converting from a rotational drive into a rotational drive, a cam mechanism converting from a linear drive into a linear drive, or a cam mechanism converting a rotational drive into one that drives linearly while rotating may be employed. For example, in the present embodiment, a cam mechanism that converts a rotational drive of the motor into a linear drive (+X direction or −X direction) is used.

In the present embodiment, the mechanism unit 34 drives the motor on the basis of the control signal S3, and a driving force of the motor is supplied to the cam mechanism. The cam mechanism uses the supplied driving force to drive the drive part 50 with a predetermined driving force.

In FIG. 2, the drive part 50 includes a base body 51 extending in the X direction, an end portion 511 which is an end of the base body 51 on the +X direction side, a first protruding part 531 extending in a −Y direction from a portion of the base body 51 on the +X direction side, and a second protruding part 532 extending in the −Y direction from a portion of the base body 51 on the −X direction side.

The moving part 60 includes a base body 61 extending in the X direction, an end portion 611 which is an end portion of the base body 61 on the +X direction side, a scale 612 provided on a surface facing the drive part 50, a second protruding part 632 extending in the Y direction from a portion of the base body 61 on the −X direction side, and a first protruding part 631 extending in the Y direction from a portion of the base body 61 on the +X direction side with respect to the second protruding part 632.

In FIG. 3, the elastic part 40 includes an elastic body 41, a support member 45 provided on one end side of the elastic body 41, and a support member 46 provided on the other end side of the elastic body 41. The elastic body 41 is an elastic member such as, for example, a metal spring or rubber.

The support member 45 is provided on the −X direction side with respect to the first protruding part 531 and the first protruding part 631 to be able to be in contact with at least one of the first protruding part 531 and the first protruding part 631. The support member 46 is provided on the +X direction side of the second protruding part 532 and the second protruding part 632 to be able to be in contact with at least one of the second protruding part 532 and the second protruding part 632.

In the present embodiment, a natural length x10 [mm] (not illustrated) of the elastic body 41 is larger than a distance between the first protruding part 531 and the second protruding part 532, or a distance between the first protruding part 631 and the second protruding part 632. Therefore, the elastic body 41 pressurizes the support member 45 and the support member 46 with an elastic force in a direction in which the distance between the support member 45 and the support member 46 increases.

Figure 4:
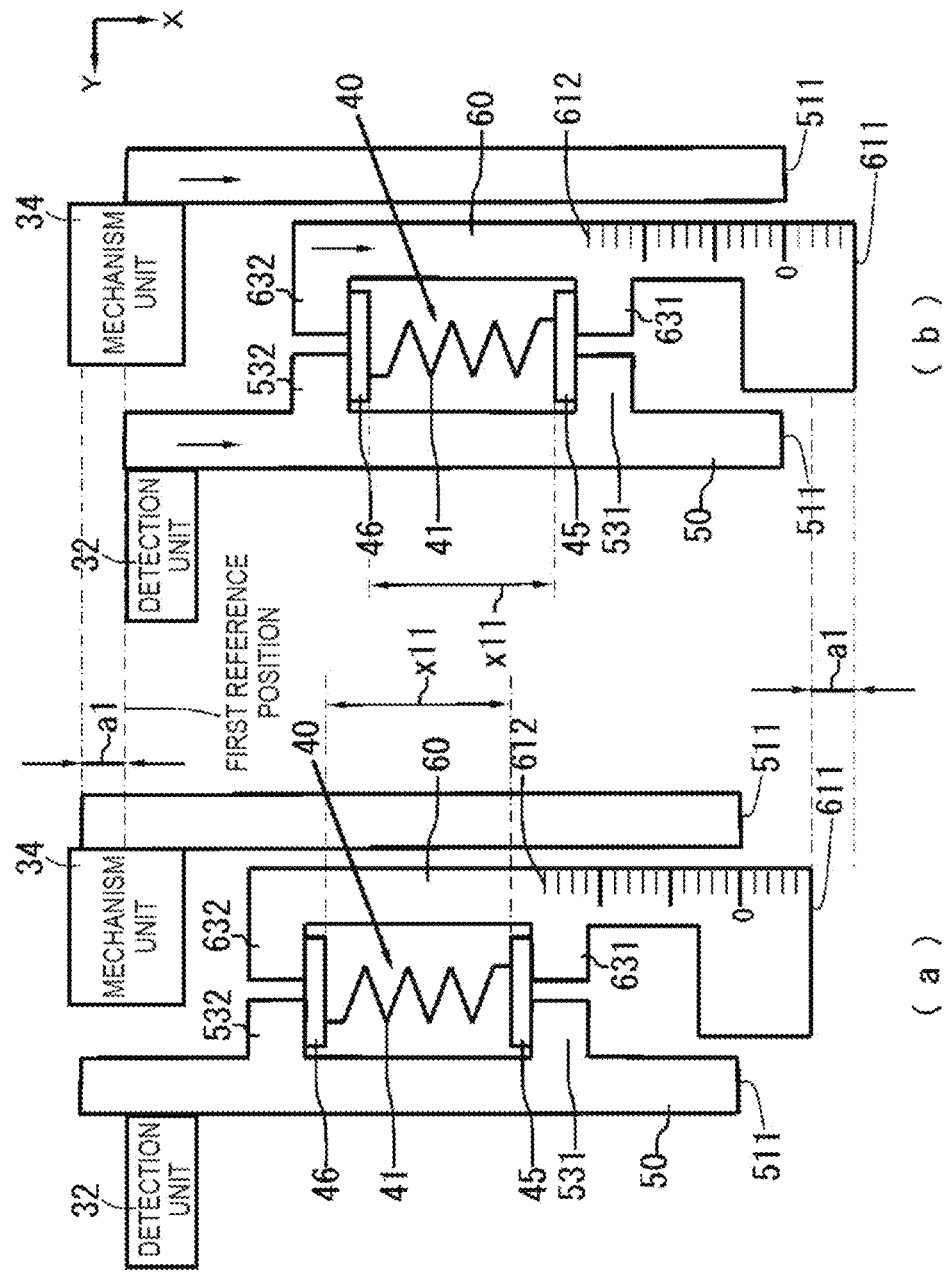
FIG. 4 is a view for explaining an operation of the actuator of the first embodiment.
Figure 5:
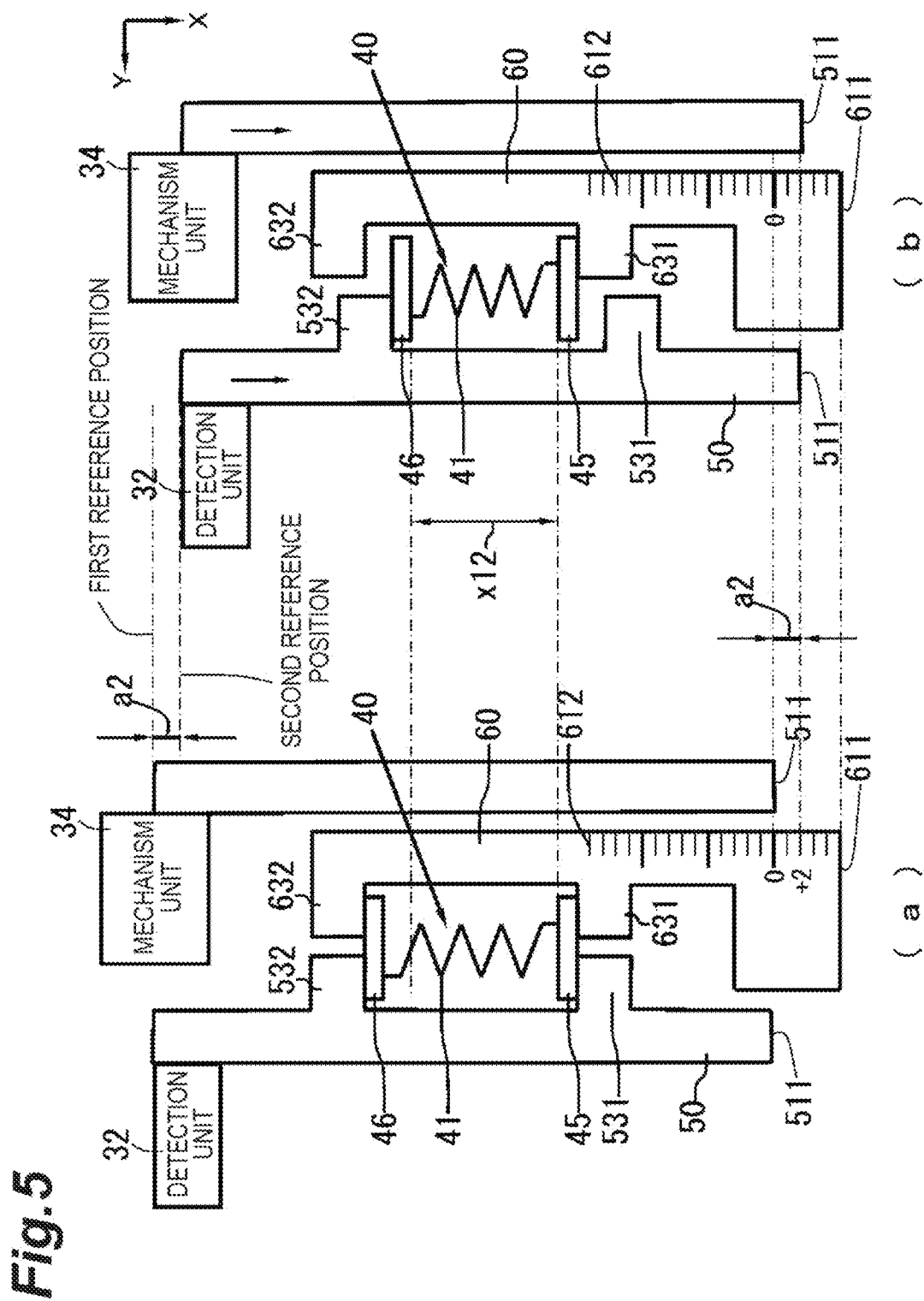
FIG. 5 is another view for explaining an operation of the actuator of the first embodiment.
Figure 6:
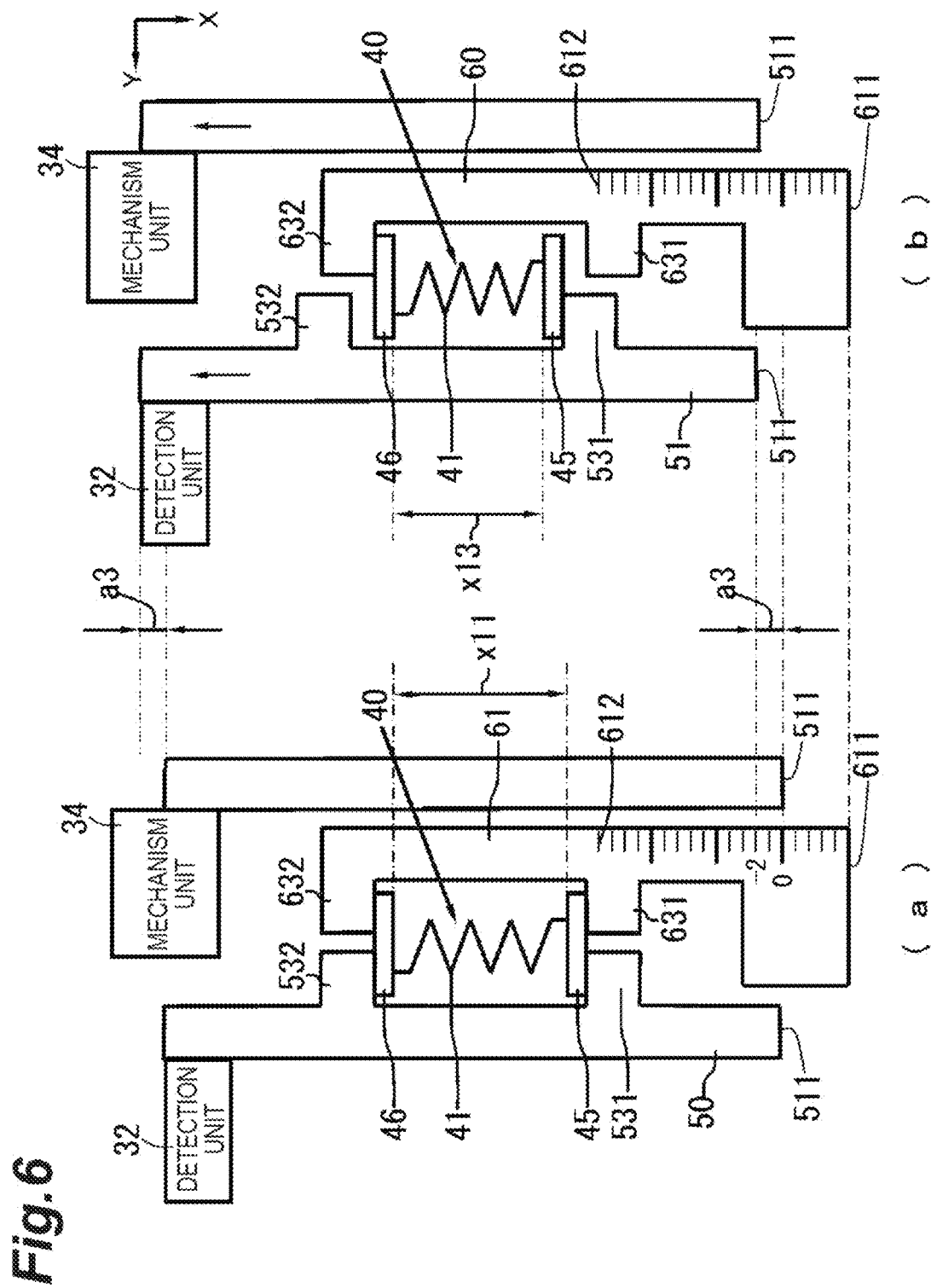
FIG. 6 is still another view for explaining an operation of the actuator of the first embodiment.

Next, an operation of the actuator will be described. FIGS. 4 to 6 are views for explaining an operation of the actuator of the first embodiment.

FIG. 4(a) is a view illustrating an initial state. In the initial state of the present embodiment, the first protruding part 531 and the first protruding part 631 are at positions facing each other, and the second protruding part 532 and the second protruding part 632 are at positions facing each other. The support member 45 is supported by the first protruding part 531 and the first protruding part 631, and the support member 46 is supported by the second protruding part 532 and the second protruding part 632.

In the initial state illustrated in FIG. 4(a), the control unit 33 does not output the control signal S3 for driving the drive part 50, and the drive part 50 is stopped. The detection unit 32 outputs the detection signal S2 to the control unit 33, and the control unit 33 stores position information of the drive part 50 in the storage unit 35 on the basis of the detection signal S2.

The elastic body 41 is pressurized and compressed by the first protruding part 531 and the first protruding part 631, and the second protruding part 532 and the second protruding part 632, and has a length of x11 [mm]. In the state of FIG. 4(a), the elastic body 41 is contracted by (x10−x11) [mm] from the natural length x10 [mm].

In the state of FIG. 4(a), the elastic body 41 is sandwiched between the first protruding part 531 and the second protruding part 532. Therefore, the elastic body 41 is compressed by a force F0 (a force with which the first protruding part 531 and the second protruding part 532 compress the elastic body 41) to have a length of x11 [mm], and generates an elastic force of an amount equal to the force F0. Further, when a spring multiplier of the elastic body 41 is assumed to be k1 [N/mm], the force F0=k1×(x10−x11) [N].

In the state of FIG. 4(a), the end portion 511 of the drive part 50 is at a position 0 (zero) on the scale 612 of the moving part 60. This position is referred to as a first position.

FIG. 4(b) illustrates a state in which the drive part 50 has been driven in the +X direction from the state in FIG. 4(a) by a first driving force. The control unit 33 outputs the control signal S3 for driving the drive part 50 in the +X direction with the first driving force to drive the drive part 50 in the +X direction with the first driving force. The detection unit 32 outputs the detection signal S2 to the control unit 33, and the control unit 33 stores the position information of the drive part 50 in the storage unit 35 on the basis of the detection signal S2.

The first driving force may be a force smaller than, for example, the force F0 (a force with which the first protruding part 531 and the second protruding part 532 compress the elastic body 41). The first driving force is preferably, for example, a value of the force F0 or less and ½0 or more of the force F0. More preferably, the first driving force is, for example, a value of the force F0 or less and ⅒ or more of the force F0.

The first driving force of the drive part 50 is transmitted to the moving part 60 via the elastic part 40, and the drive part 50 and the moving part 60 move in the +X direction to move the valve body 76 in the +X direction until the valve body 76 (see FIG. 1) and the contact part 771 of the pipe part 77 (see FIG. 1) come into contact with each other.

When the drive part 50 moves in the +X direction by a distance a1 from the state in FIG. 4(a) and the valve body 76 comes into contact with the contact part 771, the moving part 60 receives a resistance force from the contact part 771 and cannot move. Since the first driving force is equal to or less than the force F0 and the elastic part 40 does not contract, the drive part 50 cannot move either. At this time, the detection unit 32 outputs the detection signal S2 to the control unit 33, and the control unit 33 stores the position information of the drive part 50 in the storage unit 35 as a first reference position on the basis of the detection signal S2.

Further, in FIG. 4(b), since the elastic body 41 is not contracted (a length of the elastic body 41 is x11), the end portion 511 of the drive part 50 is at the position 0 (zero) (first position) on the scale 612 of the moving part 60.

FIG. 5(a) is the same state as in FIG. 4(b). FIG. 5(b) illustrates a state in which the drive part 50 has been driven in the +X direction from the state in FIG. 5(a) by a second driving force.

In FIG. 5(b), the control unit 33 outputs the control signal S3 for driving the drive part 50 in the +X direction with the second driving force to drive the drive part 50 in the +X direction with the second driving force. The second driving force is a force larger than, for example, the force F0 (a force with which the first protruding part 531 and the second protruding part 532 compress the elastic body 41). The detection unit 32 outputs the detection signal S2 to the control unit 33, and the control unit 33 stores the position information of the drive part 50 in the storage unit 35 on the basis of the detection signal S2.

Since the valve body 76 and the contact part 771 are in contact with each other, the moving part 60 cannot move (hardly moves) in the +X direction. Therefore, when the drive part 50 is driven in the +X direction by the second driving force, the elastic body 41 is compressed. The second driving force is transmitted to the moving part 60 via the elastic part 40, and the valve body 76 and the contact part 771 are pressed more strongly (retightening).

Thereafter, when the drive part 50 moves in the +X direction by a distance a2 from the state in FIG. 5(a), the control unit 33 determines that a second control end condition (a distance for moving the drive part 50 by the second control is a2 [mm]) to be described later is satisfied and stops the drive part 50. At this time, the control unit 33 stores the position information of the drive part 50 in the storage unit 35 as a second reference position on the basis of the detection signal S2.

In FIG. 5(b), the drive part 50 has moved by the distance a2 [mm] due to the second driving force, and the length of the elastic body 41 is x12 [mm] which is smaller than x11 [mm]. In the present embodiment, x11 [mm]=x12+a2 [mm], and an elastic force F1=k1×(x10−x12) [N] is generated in the elastic body 41.

The second driving force is preferably, for example, a value equal to or less than a rated driving force at the time of a normal control of the motor of the mechanism unit 34 and equal to or more than the force F0 (a force with which the first protruding part 531 and the second protruding part 532 compress the elastic body 41). More preferably, the second driving force is, for example, a value equal to or less than the rated driving force at the time of the normal control of the motor and twice or more the force F0.

In FIG. 5(b), since the elastic body 41 is shortened by the distance a2 [mm], the end portion 511 of the drive part 50 has moved by two (two scale marks) in the +X direction from the position 0 (zero) on the scale 612. This position is referred to as a second position.

FIG. 6(a) is a view for explaining a state similar to that of FIG. 4(b). In the fluid control device 1 illustrated in FIG. 6(a), a position of the moving part 60 is fixed using an external member (not illustrated) in the state of FIG. 4(a). With the position of the moving part 60 fixed, the control unit 33 performs the first control for driving the drive part 50 in the −X direction with a third driving force. The third driving force is, for example, a force in a direction opposite to that of the first driving force and having the same magnitude as the first driving force.

Since the third driving force is a smaller force than, for example, the force F0 (a force with which the first protruding part 531 and the second protruding part 532 compress the elastic body 41), the drive part 50 cannot move. The control unit 33 stores the position information of the drive part 50 in the storage unit 35 as a third reference position on the basis of the detection signal S2. Further, in FIG. 6(a), the end portion 511 of the drive part 50 is at the position 0 (zero) (first position) on the scale 612 of the moving part 60.

In FIG. 6(b), the control unit 33 outputs the control signal S3 for driving the drive part 50 in the −X direction with a fourth driving force to perform the second control for driving the drive part 50 in the −X direction with the fourth driving force. The fourth driving force is, for example, a force having the same magnitude as the second driving force and in a direction opposite to that of the second driving force.

Thereafter, when the drive part 50 moves in the −X direction by a distance a3 from the state in FIG. 6(*a*), the control unit 33 determines that the second control end condition (a distance for moving the drive part 50 by the second control is −a3 [mm]) is satisfied and stops the drive part 50. At this time, the control unit 33 stores the position information of the drive part 50 in the storage unit 35 as a fourth reference position on the basis of the detection signal S2.

In FIG. 6(*b*), since the drive part 50 has been driven by the fourth driving force, the length of the elastic body 41 is x13 [mm] which is shorter than x11 [mm]. In the present embodiment, x11 [mm]=x13+a3 [mm], and an elastic force F2=k1×(x10−x13) [N] is generated in the elastic body 41.

In FIG. 6(*b*), since the elastic body 41 is shortened by a distance a3 [mm], the end portion 511 of the drive part 50 has moved by two (two scale marks) in the −X direction from the position 0 (zero) on the scale 612. This position is referred to as a third position.

Next, an operation of the fluid control device will be described. FIG. 7 is a view for explaining an operation of the fluid control device of the first embodiment.

As illustrated in FIG. 7, first, the device is installed in step 1. In the present embodiment, the moving part 60 of the actuator 2 (see FIG. 1) and the connection part 75 of the valve device 3 (see FIG. 1) are connected at a site such as a factory. Also, necessary electrical power is supplied to the fluid control device 1.

In step 2, the user performs a predetermined setting using the operation unit 31. The operation unit 31 outputs information on the predetermined setting to the control unit 33 as the operation signal S1. The control unit 33 stores the information (operation signal S1) on the predetermined setting in the storage unit 35.

As the predetermined setting, for example, setting of a magnitude of the first driving force, setting of a magnitude of the second driving force, setting of a magnitude of the third driving force, setting of a magnitude of the fourth driving force, setting of the second control end condition, setting of a driving force at the time of the normal control, and the like can be exemplified. As the driving force at the time of the normal control, a rated driving force at the time of the normal control, a maximum driving force at the time of the normal control, a minimum driving force at the time of the normal control, and the like can be exemplified.

For example, magnitudes of the first to fourth driving forces may be set according to a value corresponding to a force [N], may be set according to a value corresponding to the pressure [Pa], may be set according to a length [mm] of the elastic body 41 contracted by the first to fourth driving forces applied to the elastic body 41, or may be set according to a rotation speed of the motor of the mechanism unit 34, a current supplied to the motor, or the like.

For example, in the present embodiment, the user has been informed in advance of the natural length x10 and the length x11 (see FIG. 4(*a*)) of the elastic body 41, and the force F0 (a force with which the first protruding part 531 and the second protruding part 532 compress the elastic body 41). Therefore, the user sets, for example, the force F0×(1/10) as the first driving force. For example, in the present embodiment, the rated driving force at the time of the normal control is set as the second driving force. For example, an integer multiple of the force F0 may be set as the second driving force.

Also, the user can set the second control end condition using the operation unit 31. The second control end condition is an arbitrary condition for ending the second control. For example, in the present embodiment illustrated in FIG. 5, "the distance a2 [mm] for moving the drive part 50 by the second control" is set as the second control end condition.

Whether or not the drive part 50 has moved by the distance a2 [mm] may be determined by, for example, the control unit 33 detecting a rotation speed of the motor of the mechanism unit 34, by the control unit 33 monitoring the detection signal S2 of the detection unit 32, or by other methods.

For example, since the stepping motor is used in the present embodiment, a rotation speed of the motor and a movement distance of the drive part 50 have a one-to-one correspondence. Also, when the drive part 50 moves by the distance a2 [mm] during the second control, the elastic body 41 contracts by the distance a2 [mm].

As described with reference to FIG. 5(*b*), x11 [mm]=x12+a2 [mm], the length of the elastic body 41 changes from x11 [mm] to x12 [mm] when the elastic body 41 contracts by the distance a2 [mm], and the elastic force F1=k1×(x10−x12) [N] is generated in the elastic body 41. The elastic force F1 corresponds to a force with which the valve body 76 pressurizes the contact part 771 when the second control is completed.

Therefore, the user inputs a desired value corresponding to the elastic force F1=k1×(x10−x12) [N] by using the operation unit 31. The operation unit 31 outputs the elastic force F1 to the control unit 33 as the operation signal S1.

The control unit 33 calculates the movement distance a2 [mm] of the drive part 50 from the elastic force F1, calculates a rotation speed A [rotation] of the stepping motor for moving the drive part 50 by the movement distance a2 [mm], and outputs the rotation speed A [rotation] to the mechanism unit 34 as the control signal S3.

When the stepping motor of the mechanism unit 34 performs A− rotations, the drive part 50 moves by the distance a2 [mm], the elastic body 41 contracts by the distance a2 [mm], and the valve body 76 pressurizes the contact part 771 with the force F1=k1×(x10−x12).

Further, the setting of the second control end condition is not limited to the above-described example. For example, when the user knows the spring multiplier k1 [N/mm] of the elastic body 41, the user may input the movement distance a2 [mm] of the drive part 50 using the operation unit 31. In this case, the operation unit 31 generates the movement distance a2 [mm] as the operation signal S1, the control unit 33 generates the rotation speed A [rotation] as the control signal S3, and thereby the stepping motor of the mechanism unit 34 performs A [rotation].

The second control end condition is not limited to the movement distance of the drive part 50. For example, a predetermined time having elapsed since the start of the second control may be used as the end condition, the motor of the mechanism unit 34 having stopped may be used as the end condition, or a pressing force between the valve body 76 and the contact part 771 becoming a predetermined value or more having been detected using a sensor installed on the valve body 76 or the contact part 771 may be used as the end condition.

In step 3, the first control is started when the user presses a start button SW1 of the operation unit 31. The first control refers to, for example, a control for driving the drive part 50 with the first driving force.

In the first control, the operation unit 31 outputs the operation signal S1 indicating that the start button SW1 (not illustrated) has been pressed to the control unit 33. The detection unit 32 outputs the detection signal S2 to the control unit 33. The control unit 33 generates the control signal S3 to drive the drive part 50 in the +X direction with the first driving force on the basis of the information stored in the storage unit 35, and outputs the control signal S3 to the mechanism unit 34.

The mechanism unit 34 drives the motor on the basis of the control signal S3 and drives the drive part 50 in the +X direction with the first driving force. When the drive part 50 is driven in the +X direction, the moving part 60 moves in the +X direction, and the valve body 76 (see FIG. 1) approaches the contact part 771 (see FIG. 1).

Thereafter, when the valve body 76 is moved in the +X direction, the valve body 76 comes into contact with the contact part 771. When the valve body 76 comes into contact with the contact part 771, the moving part 60 cannot move. Since the first driving force is smaller than the force F0, the drive part 50 cannot compress the elastic body 41, and movement of the drive part 50 also stops.

When the drive part 50 stops, the control unit 33 detects (determines) the stop of the drive part 50 on the basis of the detection signal S2 of the detection unit 32 (step 4).

In step 5, the control unit 33 stores the position information of the drive part 50 in the storage unit 35 as the first reference position. In the present embodiment, the detection signal S2 of the detection unit 32 when the drive part 50 has stopped indicates the first reference position. Further, the end portion 511 of the drive part 50 is at the position 0 (zero) (first position) on the scale 612 of the moving part 60 (see FIG. 4(b)).

Since the control unit 33 has detected the stop of the drive part 50, the control unit 33 ends the first control and starts the second control (step 6). The second control is, for example, a control for driving the drive part 50 with the second driving force.

In the second control, the control unit 33 generates the control signal S3 to drive the drive part 50 in the +X direction with the second driving force on the basis of the information stored in the storage unit 35, and outputs the control signal S3 to the mechanism unit 34. The mechanism unit 34 drives the motor on the basis of the control signal S3 and drives the drive part 50 in the +X direction with the second driving force.

Since the valve body 76 and the moving part 60 cannot move (hardly move) in the +X direction, the elastic body 41 contracts in accordance with the movement of the drive part 50. The valve body 76 comes into pressure-contact with the contact part 771.

The control unit 33 repeatedly determines whether or not the second control end condition set in step 2 is satisfied. Since, for example, "the distance a2 [mm] for moving the drive part 50 by the second control (see FIG. 5(b))" is set as the second control end condition in the present embodiment, the control unit 33 determines whether or not the second control end condition is satisfied by repeatedly detecting the rotation speed of the motor of the mechanism unit 34. When the control unit 33 determines that the second control end condition is satisfied (step 7), the control unit 33 detects the detection signal S2 of the detection unit 32.

In step 8, the control unit 33 stores the position information (the detection signal S2 of the detection unit 32) of the drive part 50, when it is determined that the second control end condition is satisfied, in the storage unit 35 as the second reference position.

After the second reference position is stored in the storage unit 35, the control unit 33 stops driving of the drive part 50 and ends the second control. Further, the end portion 511 of the drive part 50 is at a position +2 (second position) on the scale 612 of the moving part 60 (see FIG. 5(b)).

In step 9, since the second control has ended, the control unit 33 starts the normal control. The normal control is, for example, a control for moving the drive part 50, the moving part 60, the valve body 76, or the like using at least one of the first to fourth reference positions.

In the normal control, the operation unit 31 outputs the operation signal S1 on the basis of, for example, an external control signal supplied to an input part of the operation unit 31 or an operation of the operation unit 31 by the user. The control unit 33 generates the control signal S3 to drive the drive part 50 on the basis of the operation signal S1, the detection signal S2, and the information stored in the storage unit 35, and outputs the control signal S3 to the mechanism unit 34. Thereby, the valve body 76 can be freely controlled.

For example, in the present embodiment, the control unit 33 performs the normal control with the second reference position as a closed position of the valve device 3 (a state in which the valve device 3 is closed. a state in which the fluid 78 does not flow).

For the normal control, only one of the first reference position, the second reference position, the third reference position, and the fourth reference position may be used, or two or more of the first reference position, the second reference position, the third reference position, and the fourth reference position may be used. For example, when the normal control is performed using the first reference position and the second reference position, for example, the first reference position may be a state in which the fluid 78 hardly flows, and the second reference position may be a state in which the fluid 78 does not flow at all.

Since the scale 761 and the marker 762 are provided in the fluid control device 1, in the normal control, the user can easily ascertain an open/closed state of the valve device 3 and an operation of the valve body 76 by visually recognizing the scale 761 and the marker 762.

Also, a position of the marker 762 with respect to the scale 761 can also be detected by using a position detection sensor (referred to as a second position detection sensor) such as a potentiometer or an encoder. In this case, an output signal of the second position detection sensor is preferably supplied to the control unit 33. This is because more advanced control can be realized when the detection signal S2 (see FIG. 3) output from the detection unit 32 (see FIG. 3) described above and the output signal of the second position detection sensor are used.

Since the actuator 2 of the present embodiment described above uses at least one of the first reference position, the second reference position, the third reference position, and the fourth reference position, a suitable control can be realized. The fluid control device 1 can move the valve body 76 to a desired position by controlling the actuator 2.

The actuator 2 of the present embodiment includes the drive part 50 that can be driven by at least one of the first driving force and the second driving force, the moving part 60 that can move in a predetermined direction, and the elastic part 40 to which at least one of the first driving force and the second driving force is supplied from the drive part 50 and configured to supply a force for the moving part 60 to move to the moving part 60.

Therefore, the driving force of the drive part 50 is supplied to the moving part 60 via the elastic part 40, and the elastic part 40 can be compressed by driving the drive part 50 when the moving part 60 is stopped.

Since the actuator 2 of the present embodiment includes the detection unit 32 that supplies a detection signal for detecting a stop of the drive part 50 to the control unit 33, the control unit 33 can end the first control by detecting the stop of the drive part 50 on the basis of the detection signal of the detection unit 32 after the first control is performed and start the second control.

In the present embodiment, the control unit 33 of the actuator 2 can perform the first control capable of driving the drive part 50 with the first driving force and the second control capable of driving the drive part 50 with the second driving force that is stronger than the first driving force.

Therefore, the control unit 33 can bring the valve body 76 and the contact part 771 into contact with each other with a weak force by the first control. Also, the valve body 76 and the contact part 771 can be brought into pressure-contact with each other with a strong force by the second control.

For example, in the present embodiment, since the first driving force is set to a value smaller than the force F0 (a force with which the first protruding part 531 and the second protruding part 532 compress the elastic body 41), an amount of contraction of the elastic body 41 due to the first control is zero or a very small value. Since the second driving force is set to a value larger than that of the force F0, an amount of contraction of the elastic body 41 due to the second control is a relatively large value.

In the present embodiment, the second control is started from a state in which the valve body 76 and the contact part 771 are brought into contact with each other by the first control, and an "amount of movement of the drive part 50 in the X direction due to the second control" can be regarded as equal to an "amount of contraction of the elastic body 41 from the start of the first control to the completion of the second control."

Multiplying the "amount of contraction of the elastic body 41 from the start of the first control to the completion of the second control" by the spring multiplier k1 [N/mm] makes it possible to obtain a "force (amount of retightening) with which the valve body 76 pressurizes the contact part 771 when the second control is completed."

In the present embodiment, when the user performs a predetermined setting using the operation unit 31 and thereby the control unit 33 supplies the control signal S3 corresponding to the "amount of movement of the drive part 50 in the X direction due to the second control" to the mechanism unit 34 at the time of the second control, the "force (amount of retightening) with which the valve body 76 pressurizes the contact part 771 when the second control is completed" can be realized.

In the fluid control device 1 of the present embodiment, since the force (amount of retightening) with which the valve body 76 pressurizes the contact part 771 can be easily set using the operation unit 31, a suitable flow rate control of the fluid 78 can be realized. For example, even when the suitable amount of retightening (the force with which the valve body 76 pressurizes the contact part 771) varies according to a temperature or composition of the fluid 78, a degree of aging deterioration of the valve body 76 and the contact part 771, or the like, the amount of retightening can be appropriately changed using the operation unit 31.

Second Embodiment

Figure 8:
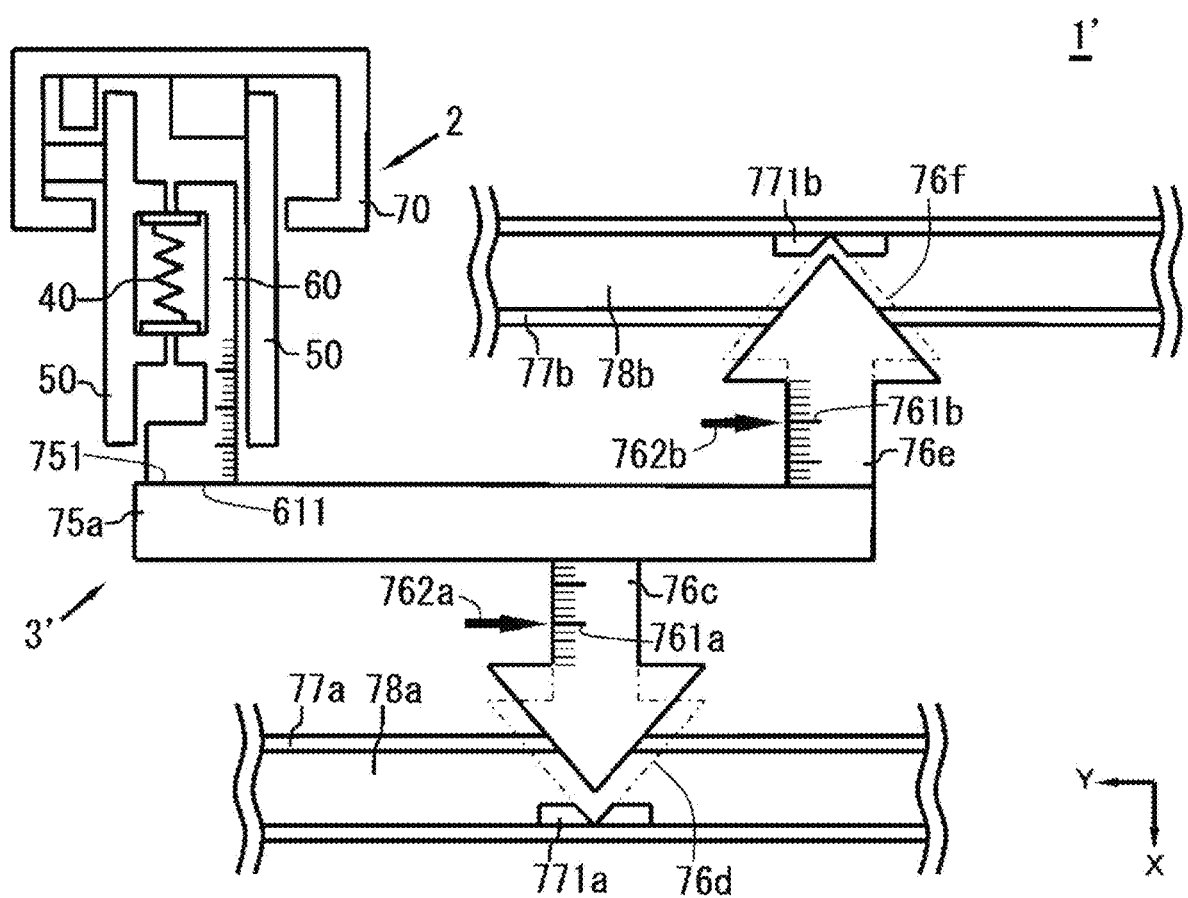
FIG. 8 is a view for explaining a fluid control device of a second embodiment.
Figure 9:
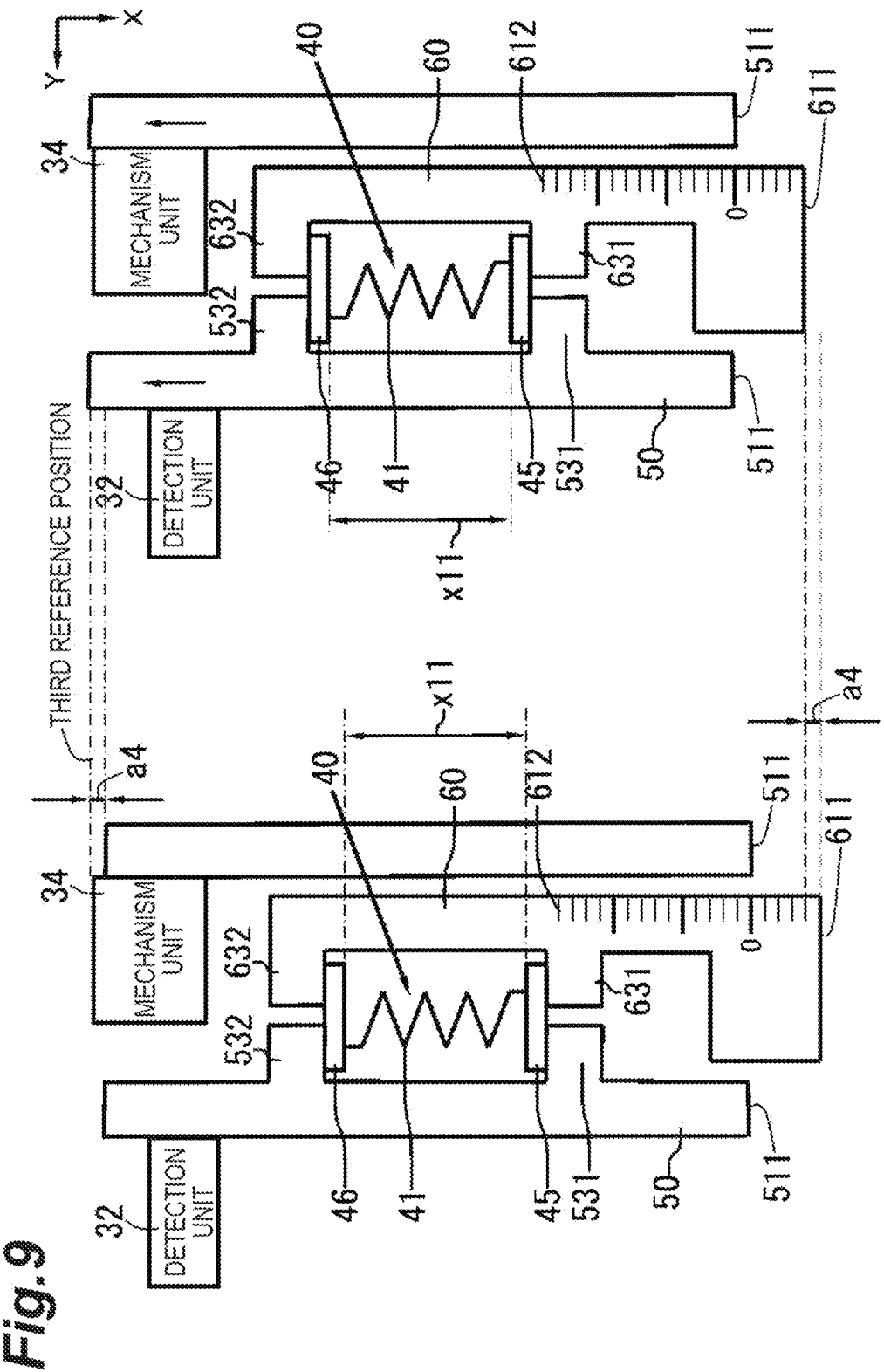
FIG. 9 is a view for explaining an operation of an actuator of the second embodiment.
Figure 10:
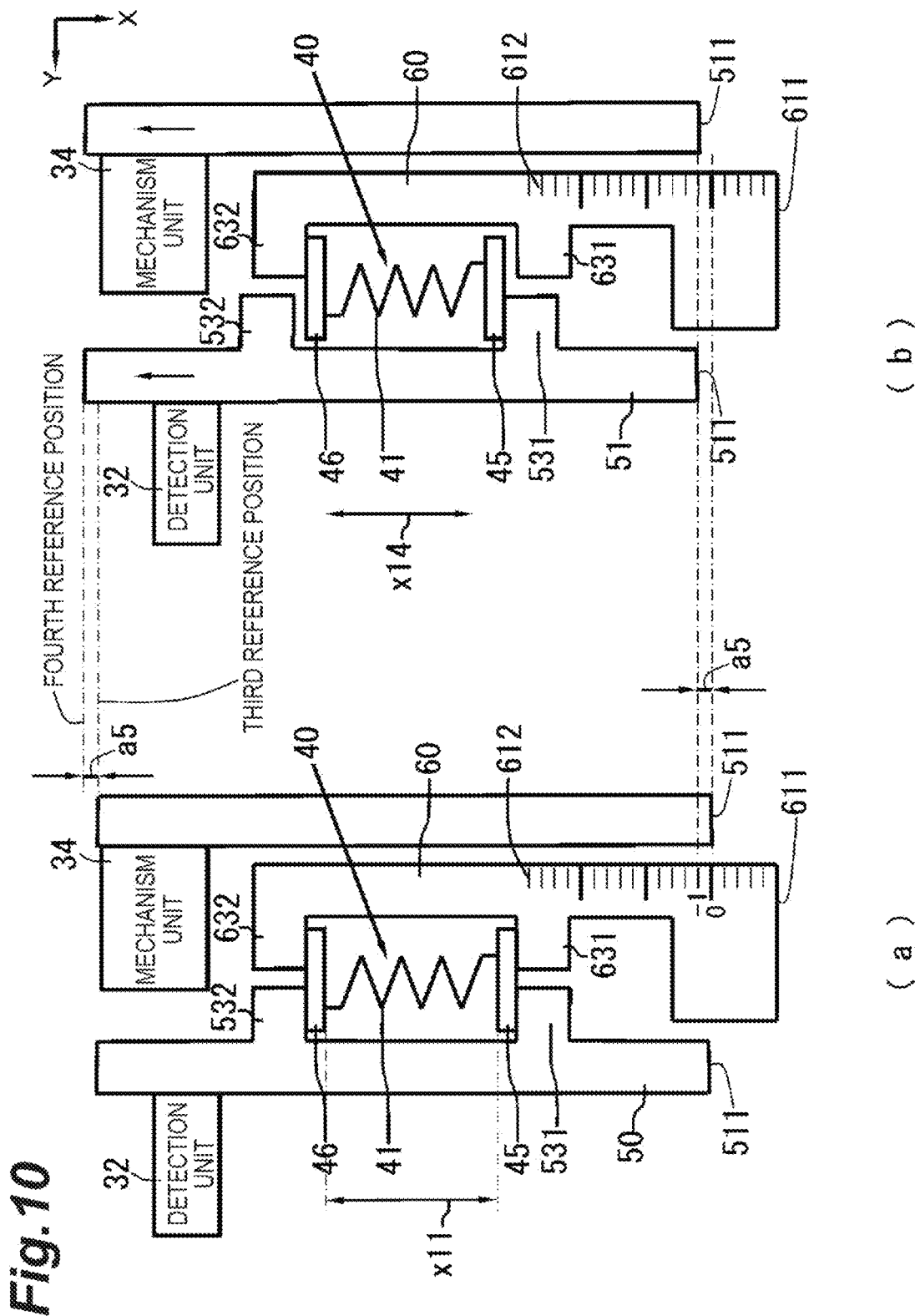
FIG. 10 is another view for explaining an operation of the actuator of the second embodiment.

FIG. 8 is a view for explaining a fluid control device of a second embodiment, FIG. 9 is a view for explaining an operation of an actuator of the second embodiment, and FIG. 10 is another view for explaining an operation of the actuator of the second embodiment. In the following description, components the same as those illustrated in FIGS. 1 to 7 will be denoted by the same reference signs and description thereof will be omitted.

In FIG. 8, the fluid control device 1' includes an actuator 2 and a valve device 3'. The valve device 3' includes a connection part 75a, valve bodies 76c and 76e, scales 761a and 761b, markers 762a and 762b, fluids 78a and 78b, pipe parts 77a and 77b, and contact parts 771a and 771b instead of the connection part 75, the valve body 76, the scale 761, the marker 762, the fluid 78, the pipe part 77, and the contact part 771.

The connection part 75a is connected to the valve bodies 76c and 76e. The valve body 76c is provided on a +X direction side of the connection part 75a, and the valve body 76e is provided on a −X direction side of the connection part 75a. The scales 761a and 761b are provided on the valve bodies 76c and 76e. The markers 762a and 762b are provided to face the scales 761a and 761b. The contact parts 771a and 771b are provided in the pipe parts 77a and 77b.

When a drive part 50 is driven in the +X direction side, the valve body 76c comes into contact with the contact part 771a and a flow of the fluid 78a is restricted. When the drive part 50 is driven in the −X direction side, the valve body 76e comes into contact with the contact part 771b and a flow of the fluid 78b is restricted.

Since operations of the valve body 76c, the scale 761a, the marker 762a, the fluid 78a, the pipe part 77a, and the contact part 771a are the same as the operations in the fluid control device 1 of the first embodiment described above, description will be made focusing on operations of the valve body 76e, the scale 761b, the marker 762b, the fluid 78b, the pipe part 77b, and the contact part 771b.

FIG. 9(a) is a view illustrating an initial state. A control unit 33 does not output a control signal S3 for driving the drive part 50, and the drive part 50 is stopped. In the state of FIG. 9(a), an end portion 511 of the drive part 50 is at a position 0 (zero) (first position) on a scale 612 of a moving part 60.

An elastic body 41 has a length of x11 [mm]. When a spring multiplier of the elastic body 41 is assumed to be k1, in the state of FIG. 4(a), the elastic body 41 is compressed by a force F0 (a force with which a first protruding part 531 and a second protruding part 532 compress the elastic body 41).

FIG. 9(b) illustrates a state in which the drive part 50 has been driven in the −X direction from the state in FIG. 9(a) by a third driving force. The third driving force is, for example, a force in a direction opposite to that of a first driving force and having the same magnitude as the first driving force. The control unit 33 outputs a control signal S3 for driving the drive part 50 in the −X direction with the third driving force to start a first control for driving the drive part 50 in the −X direction with the third driving force.

When the drive part 50 moves in the −X direction by a distance a4 from the state in FIG. 9(a) and the valve body 76e and the contact part 771b come into contact with each other, the moving part 60 receives a resistance force from the contact part 771b and cannot move. Since the third driving force is equal to or less than the force F0 and an elastic part 40 does not contract, the drive part 50 cannot move either. At this time, the control unit 33 stores position information of the drive part 50 in a storage unit 35 as a third reference position on the basis of a detection signal S2 of a detection unit 32.

Further, in FIG. 9(b), since the elastic body 41 is not contracted (a length of the elastic body 41 is x11), the end portion 511 of the drive part 50 is at the position 0 (zero) (first position) on the scale 612 of the moving part 60.

FIG. 10(a) is the same state as in FIG. 9(b). FIG. 10(b) is a state in which the drive part 50 has been driven in the −X direction from the state in FIG. 10(a) by a fourth driving force.

In FIG. 10(b), the control unit 33 outputs the control signal S3 for driving the drive part 50 in the −X direction with the fourth driving force to perform a second control for driving the drive part 50 in the −X direction with the fourth driving force. The fourth driving force is, for example, a force in a direction opposite to that of a second driving force and having the same magnitude as the second driving force. The fourth driving force is a force larger than, for example, the force F0 (a force with which a first protruding part 531 and a second protruding part 532 compress the elastic body 41).

Since the valve body 76e and the contact part 771b are in contact with each other, the moving part 60 cannot move (hardly moves) in the −X direction. Therefore, when the drive part 50 is driven in the −X direction by the fourth driving force, the elastic body 41 is compressed. The fourth driving force is transmitted to the moving part 60 via the elastic part 40, and the valve body 76e and the contact part 771b are pressed more strongly (retightening).

Thereafter, when the drive part 50 moves in the −X direction by a distance a5 from the state in FIG. 10(a), the control unit 33 determines that a second control end condition (for example, a distance for moving the drive part 50 by the second control is −a5 [mm]) is satisfied and stops the drive part 50. At this time, the control unit 33 stores the position information of the drive part 50 in the storage unit 35 as a fourth reference position on the basis of the detection signal S2.

In FIG. 10(b), since the elastic body 41 is shortened by the distance a5 [mm], the end portion 511 of the drive part 50 has moved by the distance of a5 (one scale mark) in the −X direction from the position 0 (zero) on the scale 612. This position is referred to as a third position.

Since the actuator 2 of the present embodiment described above has the same configuration as the actuator 2 of the first embodiment, the same excellent operation and effects can be achieved.

The fluid control device 1' of the present embodiment described above includes the actuator 2 and the valve device 3'. The valve device 3' includes the connection part 75a, the valve bodies 76c and 76e, the scales 761a and 761b, the markers 762a and 762b, the fluids 78a and 78b, the pipe parts 77a and 77b, and the contact parts 771a and 771b.

Therefore, the control unit 33 can realize suitable control by using at least one of the first reference position, the second reference position, the third reference position, and the fourth reference position. The fluid control device 1' can move the valve body 76c and the valve body 76e to desired positions by controlling the actuator 2.

Also, the fluid control device 1' of the present embodiment can realize the control in which the valve body 76c and the contact part 771a are brought into contact with each other and pressurized at a predetermined pressure by driving the drive part 50 in the +X direction with the first driving force or the second driving force similarly to the operation illustrated in FIGS. 4 and 5 of the first embodiment, and the control in which the valve body 76e and the contact part 771b are brought into contact with each other and pressurized at a predetermined pressure by driving the drive part 50 in the −X direction with the third driving force or the fourth driving force as illustrated in FIGS. 9 and 10 of the second embodiment.

Third Embodiment

Figure 11:
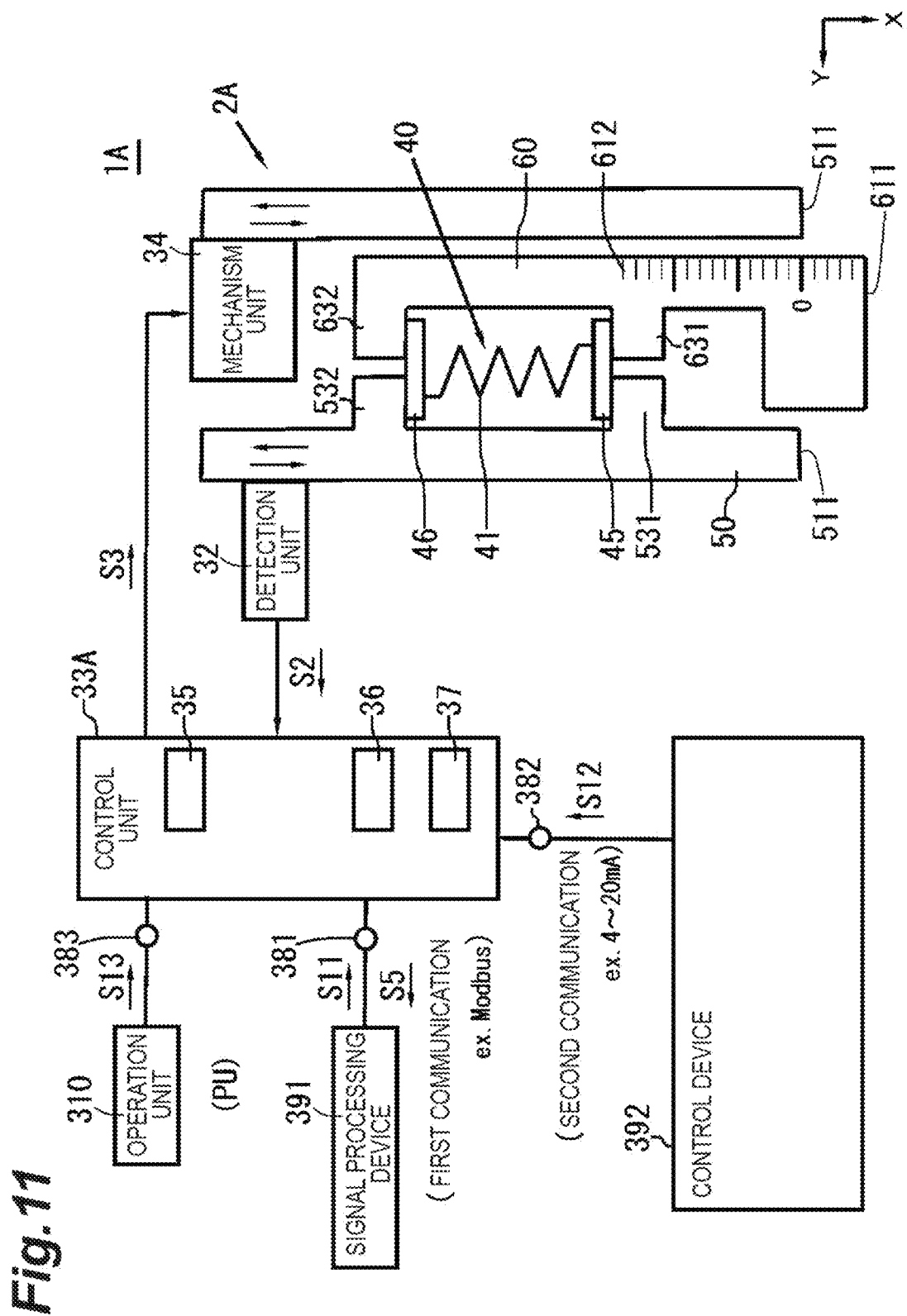
FIG. 11 is a view for explaining a fluid control device of a third embodiment.
Figure 12:
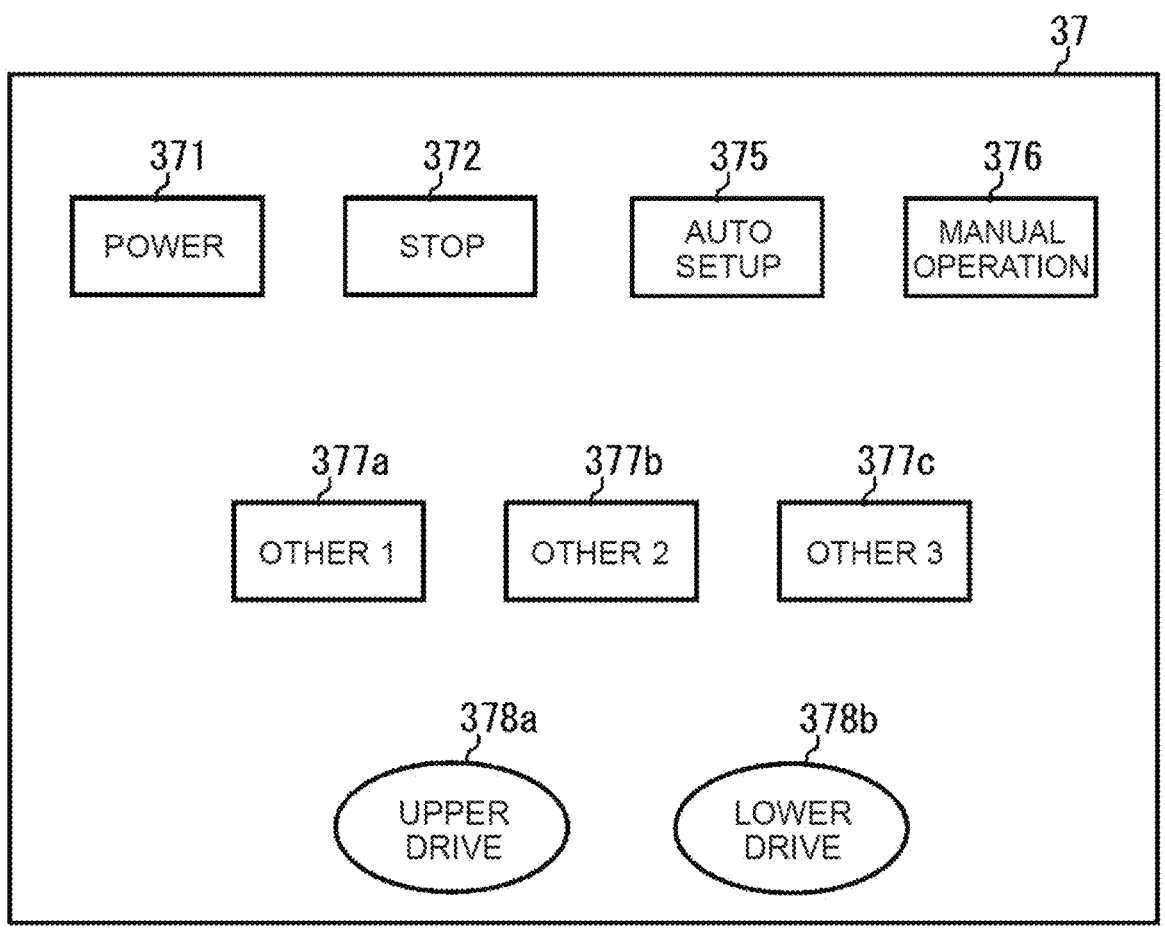
FIG. 12 is a view for explaining switches of an actuator of the third embodiment.

FIG. 11 is a view for explaining a fluid control device of a third embodiment, and FIG. 12 is a view for explaining switches of an actuator of the third embodiment. In the following description, components the same as those illustrated in FIGS. 1 to 10 will be denoted by the same reference signs and description thereof will be omitted.

In FIG. 11, the fluid control device 1A includes an actuator 2A and a valve device 3 (see FIG. 1). The actuator 2A includes a control unit 33A in place of the control unit 33 illustrated in FIG. 3 and an operation unit 310 in place of the operation unit 31 illustrated in FIG. 3.

The control unit 33A includes a microcomputer (not illustrated), a storage unit 35, a battery 36, a switch 37, a first terminal 381, a second terminal 382, and a third terminal 383.

A signal processing device 391 is an external device of the fluid control device 1A. The signal processing device 391 may be, for example, a personal computer (PC). The signal processing device 391 is electrically connected to the first terminal 381 via a predetermined communication network. In the present embodiment, the signal processing device 391 outputs a first operation signal S11, serving as a signal of a first communication protocol, to the first terminal 381 and is supplied with a monitor signal S5, serving as a monitor signal of the first communication protocol, from the first terminal 381. In the present embodiment, the first communication protocol is, for example, Modbus communication, but the present invention is not limited thereto.

A control device 392 is an external device of the fluid control device 1A. The control device 392 includes industrial instruments such as, for example, various sensors and controllers provided in factories, power plants, or the like. In the control device 392, a controller performs a predetermined calculation according to signals output from various sensors such as, for example, a sensor for detecting a liquid level and a temperature sensor, and a second operation signal S12 of a second communication protocol different from the first communication protocol is output from the controller to the second terminal 382.

In the present embodiment, the second communication protocol is, for example, a communication defined by an analog current signal of 4 mA to 20 mA standardized in an industrial instrument, but the present invention is not limited thereto.

The operation unit 310 is provided, for example, outside a case 70 (see FIG. 2). The operation unit 310 includes a plurality of operation buttons (not illustrated) that can be operated by a user, and an electric circuit (not illustrated) for generating a signal.

The operation unit 310 is electrically connected to the third terminal 383 and outputs a third operation signal S13 which is a signal of a third communication protocol different from the first communication protocol and the second communication protocol. For example, in the present embodiment, the third terminal 383 is a connector such as a LAN cable, a USB cable, or the like, and the operation unit 310 is electrically connected to the third terminal 383 by a LAN cable, a USB cable, or the like.

The storage unit 35 of the control unit 33A stores information such as the first operation signal S11 supplied from the signal processing device 391, the second operation signal S12 supplied from the control device 392, the third operation signal S13 supplied from the operation unit 310, and calculation results of the control unit 33A. The battery 36 supplies power to the control unit 33A or the like when power supply of the fluid control device 1A is turned off, when a power failure occurs, or the like.

The switch 37 of the control unit 33A is provided, for example, in a predetermined area on an outer wall of the case 70 (see FIG. 2). The switch 37 is connected to the microcomputer of the control unit 33A using electrical wiring (not illustrated). Any switch such as, for example, a tact switch, a DIP switch, a volume switch, and buttons of various types can be selected for the switch 37.

FIG. 12 is a view for explaining the switch 37. In FIG. 12, the switch 37 includes a plurality of operation buttons 371 to 378b that can be operated by the user. A power button 371 is a power button for the fluid control device 1A. The stop button 372 is a button for stopping the fluid control device 1A in an emergency.

An auto setup button 375 is a button for starting the first control and the second control described above. Hereinafter, a control operation that performs the second control after performing the first control is referred to as an auto setup.

In the present embodiment, since the auto setup button 375 is provided on the case 70, the first control and the second control are automatically executed simply by the user pressing the auto setup button 375. As will be described later, settings of the first control and the second control are preferably stored in the storage unit 35 in advance at the time of shipment from the factory.

The manual operation button 376 is a button for determining whether or not to perform a manual operation. For example, when the manual operation button 376 is made in an ON state, a manual operation mode is set, and when the manual operation button 376 is made in an OFF state, a non-manual operation mode is set.

Buttons 377a to 377c are other buttons. Other buttons are buttons that allow arbitrary operations such as, for example, inputting numbers or characters, selecting YES or NO, and selecting one of a plurality of items.

An upper drive button 378a is a button for driving the drive part 50 to a position on an upper side (−X direction side), and a lower drive button 378b is a button for driving the drive part 50 to a position on a lower side (+X direction side).

Figure 14:
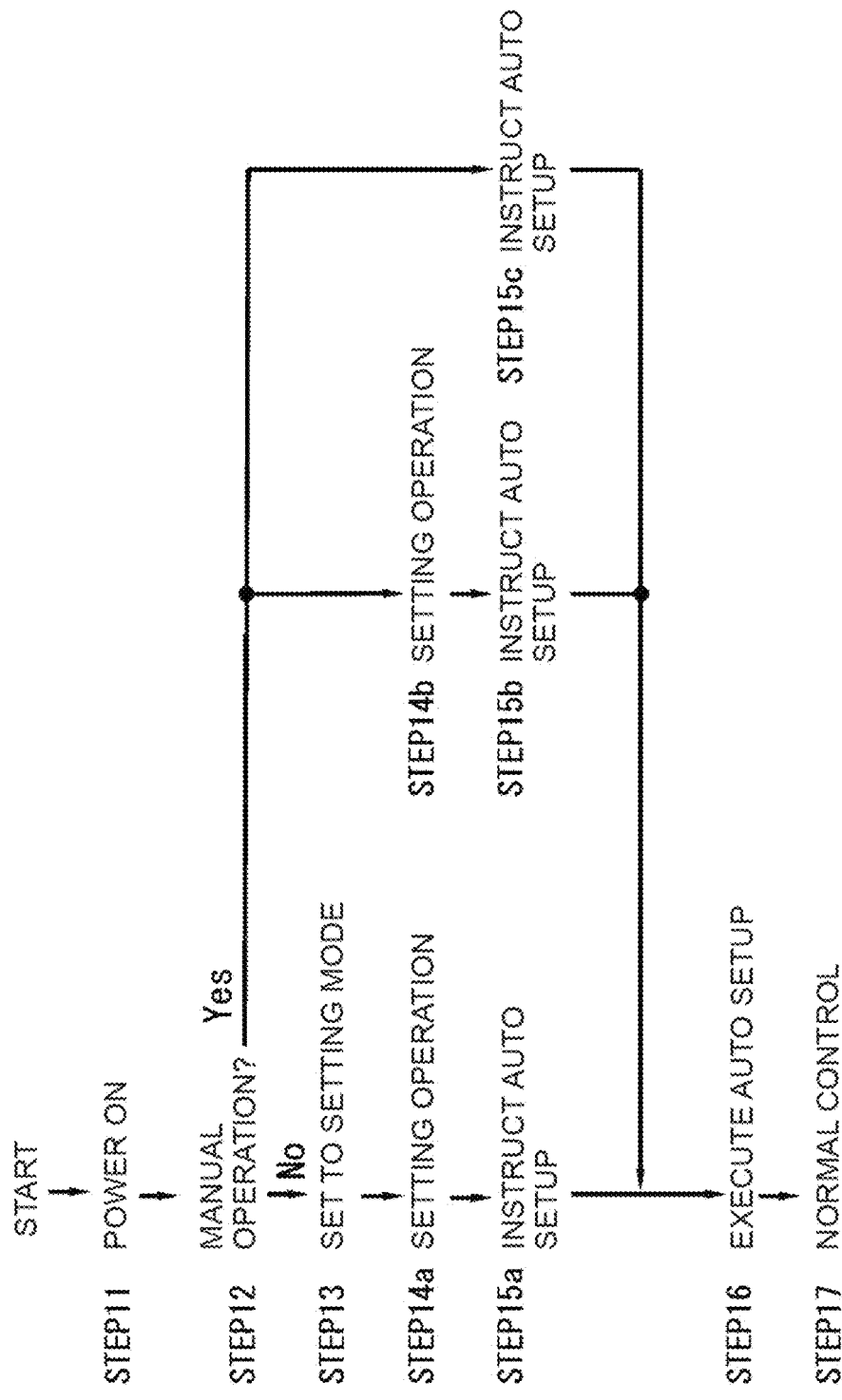
FIG. 14 is another view for explaining an operation of the fluid control device of the third embodiment.
Figure 15:
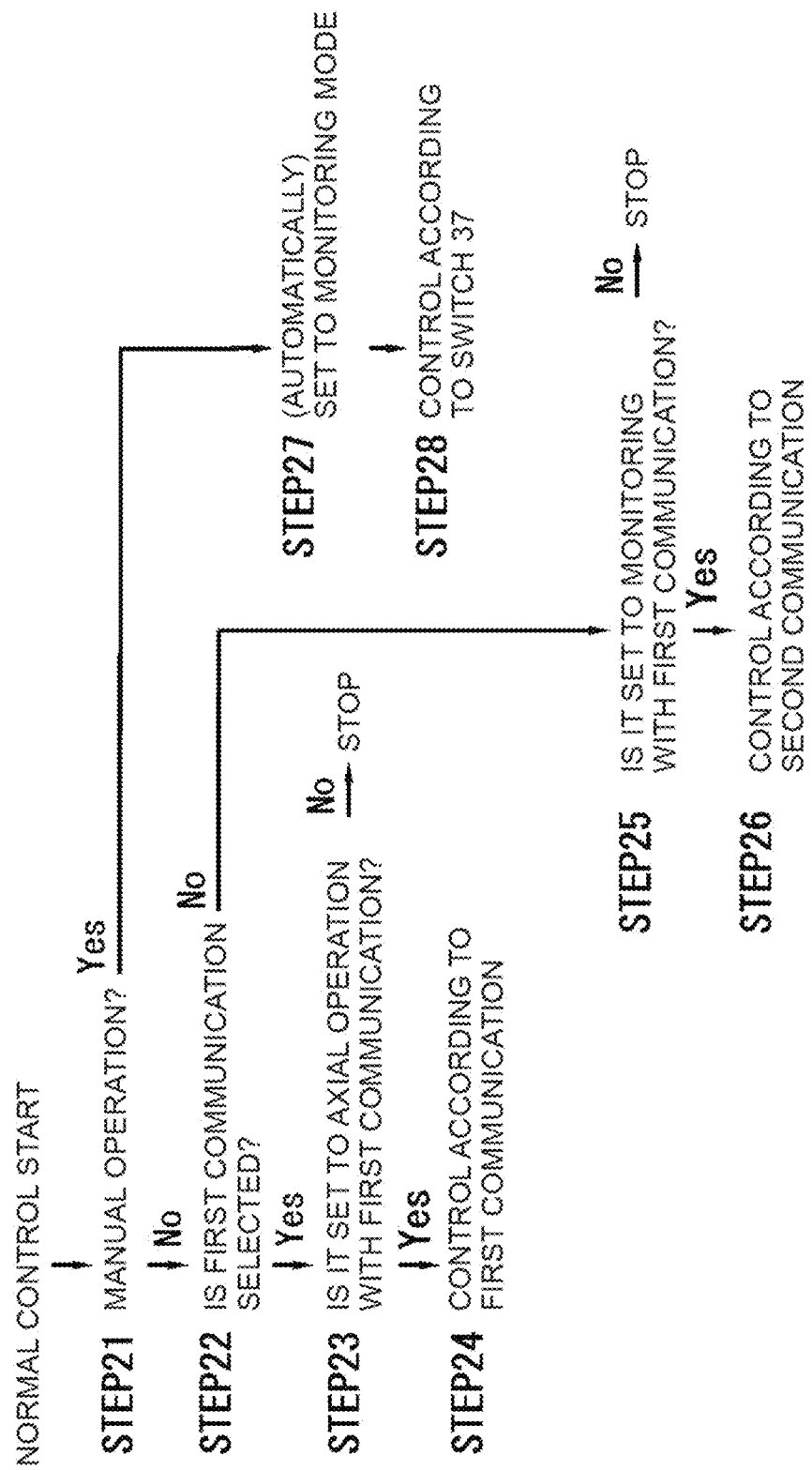
FIG. 15 is still another view for explaining an operation of the fluid control device of the third embodiment.
Figure 16:
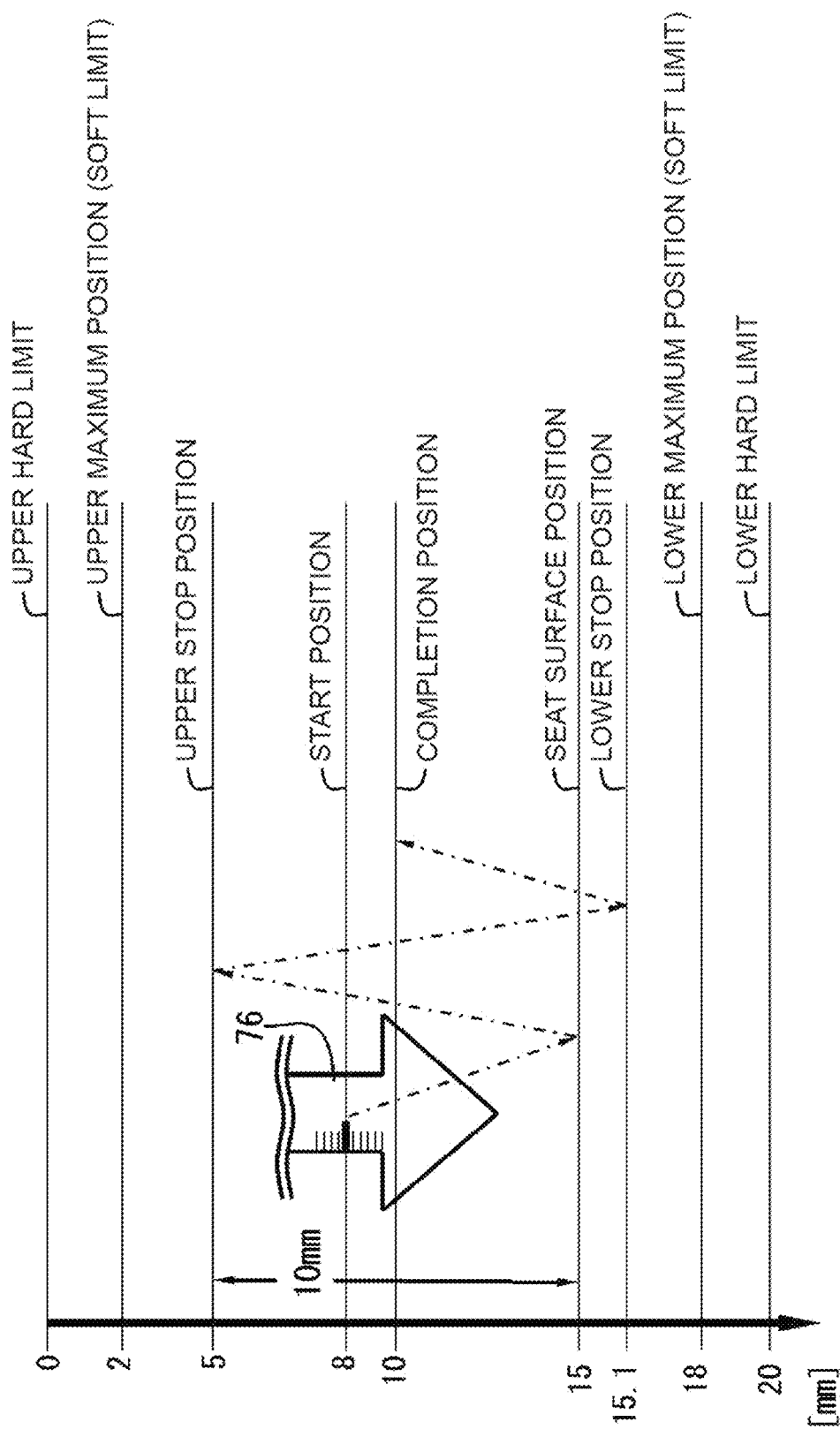
FIG. 16 is yet another view for explaining an operation of the fluid control device of the third embodiment.

FIG. 13 is a view for explaining an operation of the fluid control device of the third embodiment, FIG. 14 is another view for explaining an operation of the fluid control device of the third embodiment, FIG. 15 is still another view for explaining an operation of the fluid control device of the third embodiment, and FIG. 16 is yet another view for explaining an operation of the fluid control device of the third embodiment. In the following description, components the same as those illustrated in FIGS. 1 to 12 will be denoted by the same reference signs and description thereof will be omitted.

As illustrated in FIG. 13, the fluid control device of the present embodiment can be switched between the manual mode and the non-manual mode. The manual mode is a mode in which control of various types can be performed using the switch 37 or the operation unit 310. When the manual operation button 376 illustrated in FIG. 12 is made in an ON state, the manual mode is set, and when the manual operation button 376 is made in an OFF state, the non-manual mode is set.

In the manual mode, for example, the start of the auto setup can be instructed using the auto setup button 375 or the operation unit 310, a position of the drive part 50 or the like during the auto setup operation can be set using the operation unit 310, or an axial operation of the drive part 50 can be executed during a normal control using the upper drive button 378a, the lower drive button 378b, or the operation unit 310.

In the non-manual mode, control of various types cannot be performed using the switch 37 or the operation unit 310, and control of various types can be performed using the first communication (Modbus communication) or the second communication (current signal of 4 mA to 20 mA).

In the present embodiment, in a case of the non-manual mode, it is possible to switch to a first communication mode in which the axial operation of the drive part 50 or the like is performed according to the first operation signal S11 of the first communication (Modbus communication), or a second communication mode in which the axial operation of the drive part 50 or the like is performed according to the second operation signal S12 of the second communication (current signal of 4 mA to 20 mA).

In the non-manual mode, a detailed setting of the first communication should be made. For the detailed setting of the first communication, any of "perform monitoring using first communication," "perform axial operation using first communication," and "perform setting using first communication" should be selected.

In the non-manual mode, control of various types can be performed only when the detailed setting of the first communication is set to a predetermined setting. This is for preventing malfunction due to a careless mistake of the user.

For example, when the first communication (Modbus communication) mode is set, if the detailed setting of the first communication is set to the "perform monitoring using first communication," the user can ascertain a state of the actuator 2A using the monitor signal S5 supplied from the first terminal 381 to the signal processing device 391.

When the first communication (Modbus communication) mode is set, if the detailed setting of the first communication is set to the "perform axial operation using first communication," it is possible to control for driving the drive part 50 (axial operation) using the first communication during the normal control.

When the first communication mode is set, if the detailed setting of the first communication is set to the "perform setting using first communication," it is possible to instruct the start of the auto setup or set a position of the drive part 50 or the like during the auto setup operation using the first communication (the signal processing device 391).

When the second communication (current signal of 4 mA to 20 mA) mode is set, if the detailed setting of the first communication is set to the "perform monitoring using first communication," the drive part 50 can be axially operated using the second communication during the normal control, and the user can ascertain a state of the actuator 2A using the monitor signal S5 supplied from the first terminal 381 to the signal processing device 391.

When the second communication mode is set, if the detailed setting of the first communication is set to the "perform setting using first communication," it is possible to instruct the start of the auto setup or set a position of the drive part 50 or the like using the first communication.

Next, a detailed control flow of the fluid control device will be described with reference to FIGS. 14 to 16.

In order to operate the fluid control device of the present embodiment, first, as illustrated in FIG. 14, the user turns on the power button 371 of the switch 37 in step 11.

At this time, as illustrated in FIG. 16, the valve body 76 is stopped at a start position 8 mm. The scale on the vertical axis of FIG. 16 is a reading value of the scale 761 illustrated in FIG. 1 (value of the scale 761 corresponding to a position of the marker 762). In the embodiment illustrated in FIG. 16, the position of the valve body 76 is set as the start position (8 mm), but a position of the drive part 50, a position of the moving part 60, or the like may be set (specified) as the start position.

In the present embodiment, an upper maximum position is provided at a position 2 mm above the start position 8 mm, and an upper hard limit is provided at a position 0 mm on an upper side of the upper maximum position. The upper maximum position is an uppermost position that can be driven by electrical control, and the upper hard limit is an uppermost position that can be driven mechanically.

Similarly, a lower maximum position is provided at a position 18 mm below the start position 8 mm, and a lower hard limit is provided at a position 20 mm on a lower side of the lower maximum position. The lower maximum position is a lowest position that can be driven by electrical control, and the lower hard limit is a lowest position that can be driven mechanically.

In the embodiment illustrated in FIG. 16, positions of the valve body 76 are set as the upper maximum position, the upper hard limit, the lower maximum position, and the lower hard limit, but the position of the drive part 50, the position of the moving part 60, or the like may be set (specified) as the upper maximum position, the upper hard limit, the lower maximum position, and the lower hard limit A seat surface position is, for example, a position when driving of the drive part 50 stops when the drive part 50 is driven by the first control (first driving force). The seat surface position may be, for example, a position of the drive part 50 when driving of the drive part 50 is stopped when the drive part 50 is driven by the first control, a position at which the valve body 76 stops when the drive part 50 is driven by the first control, or a position when the valve body 76 and the contact part 771 (see FIG. 1) come into contact with each other when the drive part 50 is driven by the first control.

For example, in the embodiment illustrated in FIG. 16, the seat surface position (15 mm) is a position of the valve body 76 when driving of the drive part 50 is stopped when the drive part 50 is driven by the first control. In the embodiment illustrated in FIG. 16, the position of the valve body 76 is used as the seat surface position, but a position of the drive part 50, a position of the moving part 60, or the like may be set (specified) as the seat surface position.

The lower stop position is, for example, a position when the valve device is in a closed state (a state in which the valve device 3 is closed. a state in which the fluid 78 does not flow) or a position when the drive part 50 stops when the drive part 50 is driven by the second control (second driving force). The lower stop position may be, for example, a position of the drive part 50 when the drive part 50 stops when the drive part 50 is driven by the second control (second driving force), a position when the valve body 76 stops when the drive part 50 is driven by the second control (second driving force), a position determined by a magnitude of the second driving force and an elastic force of the elastic body 41, or a position that serves as a reference of the normal control.

For example, in the embodiment illustrated in FIG. 16, the lower stop position (15.1 mm) is a position of the valve body 76 when the drive part 50 stops when the drive part 50 is driven by the second control (second driving force). In the embodiment illustrated in FIG. 16, the lower stop position is at 15.1 mm, but the lower stop position may be at a value substantially equal to the seat surface position (15 mm) such as 15.01 mm or 15.001 mm.

In the embodiment illustrated in FIG. 16, the position of the valve body 76 is set as the lower stop position, but a position of the drive part 50, a position of the moving part 60, or the like may be set (specified) as the lower stop position. For example, an amount of displacement between the seat surface position and the lower stop position when the seat surface position and the lower stop position are defined by the position of the drive part 50 is a value obtained by adding an amount of contraction of the elastic body 41 to an amount of displacement between the seat surface position and the lower stop position when the seat surface position and the lower stop position are defined by the position of the valve body 76. Further, the amount of contraction of the elastic body 41 can be read on the scale 612 (see FIG. 11).

After the power button 371 is turned on in step 11 of FIG. 14, the user sets the manual operation mode or the non-manual operation mode by operating the manual operation button 376. In step 12, the control unit 33A determines whether or not the manual operation mode is set. When the manual operation mode is set, the processing proceeds to step 14b or step 15c, and when the manual operation mode is not determined (non-manual operation is determined), the processing proceeds to step 13.

In step 13, the user performs the detailed setting of the first communication. Specifically, any of the "perform monitoring using first communication," the "perform axial operation using first communication," and the "perform setting using first communication" is selected.

When it is determined by the user that the "perform setting using first communication" is selected, the control unit 33A proceeds processing to step 14a. When the "perform setting using first communication" is not selected, the processing cannot proceed to step 14a. This is to prevent a malfunction that the user does not intend by confirming intention of the user to perform the setting using the first communication.

In step 14a, the user performs a setting related to the auto setup operation or other settings using the signal processing device 391 (first communication). For example, in the present embodiment, a push-in amount is set to 1 mm and a stroke is set to 10 mm as the setting related to the auto setup operation. The set value is stored in the storage unit 35.

The push-in amount can be set to, for example, a length (amount of contraction) in which the elastic body 41 is contracted at the time of the second control. Also, the push-in amount may be set to, for example, a value corresponding to a difference between a position at which the drive part 50 is stopped by the first control and a position at which the drive part 50 is stopped by the second control.

Also, the push-in amount may be set to a length in which the elastic body 41 is contract by the second driving force (a force that drives the drive part 50 during the second control), or may be set to an amount that the drive part 50 contracts and drives the elastic body 41 during the second control.

Also, the push-in amount can also be set to a value corresponding to a difference between a position of the drive part 50 when the drive part 50 is stopped by the first control and a position of the drive part 50 when the drive part 50 is stopped by the second control, a value corresponding to a difference between a position at which the valve body 76 is stopped by the first control and a position at which the valve body 76 is stopped by the second control, a value determined by a drive amount of the drive part 50 and an elastic force of the elastic body 41 at the time of the second control, a value according to a magnitude of the second driving force, or a value determined by a magnitude of the second driving force and an elastic force of the elastic body 41.

In the present embodiment, the first driving force (a force that drives the drive part 50 during the first control) is set to, for example, a force smaller than the force F0 (a force with which the first protruding part 531 and the second protruding part 532 illustrated in FIG. 3 compress the elastic body 41), and the second driving force is set to, for example, a force larger than the force F0.

For example, in the present embodiment, since the elastic force of the elastic body 41 and the second driving force are predetermined, when the user inputs the push-in amount (1 mm) using the first communication, the control unit 33A controls the drive part 50 to contract the elastic body 41 and drive it by 1 mm during the second control, and the elastic body 41 is pushed-in by about 1 mm (compressed). In the present embodiment, since the elastic body 41 contracts by about 1 mm, the valve body 76 hardly moves (the valve body 76 moves slightly from the seat surface position (15 mm) to the lower stop position (15.1 mm))

For example, when the user inputs the push-in amount (2 mm) using the first communication, the drive part 50 is controlled to contract the elastic body 41 and drive it by 2 mm during the second control, and the elastic body 41 is pushed-in (compressed) by about 2 mm with a stronger force. Since the elastic body 41 contracts by about 2 mm, the valve body 76 hardly moves (the valve body 76 moves slightly from the seat surface position (15 mm) to the lower stop position (15.2 mm)).

In the present embodiment, the push-in amount is set, but the present invention is not limited thereto. For example, a method of setting a magnitude of the second driving force, a method of setting magnitudes of the first driving force and the second driving force, or the like may be employed instead of the push-in amount. This is because there is a proportional relationship between the magnitude of the second driving force and the push-in amount.

The stroke is, for example, an upward length with respect to the seat surface position (15 mm) illustrated in FIG. 16 as a starting point. In the present embodiment, since the stroke is set to 10 mm, the upper stop position is at 5 mm which is a position 10 mm above the seat surface position (15 mm). In the embodiment illustrated in FIG. 16, the position of the valve body 76 is set as the upper stop position, but a position of the drive part 50, a position of the moving part 60, or the like may be set (specified) as the upper stop position.

The upper stop position is a position at which the valve body 76 is stopped after the first control is completed and before the second control is started. In the present embodiment, the control unit 33A moves the valve body 76 to the seat surface position (15 mm) by the first control (first driving force), then moves the valve body 76 to the upper stop position (5 mm) with a force in a direction opposite to that of the first driving force, and then starts the second control.

Further. the starting point of the stroke is not limited to the seat surface position, and for example, the lower stop position (15.1 mm), the lower maximum position (18 mm), or the like may be used as the starting point. Also, in the present example, although the explanation has been made using an example of setting the upper stop position (5 mm) on the basis of the input stroke, the upper stop position (5 mm) may be directly input using the signal processing device 391 (first communication), the operation unit 310, or the like as a matter of course.

Also, the stroke may be a value corresponding to a difference between a position at which the valve body 76 stops by the first control and a position of the valve body 76 when the second control is started (immediately before the second control is started). Also, the stroke may be a value twice a difference between the position at which the valve body 76 stops by the first control and a position of the valve body 76 when the normal control is started (immediately before the normal control is started).

After the predetermined setting is made in step 14*a*, the user instructs execution of the auto setup using the signal processing device 391 (first communication) in step 15*a*. In step 16, the control unit 33A executes the auto setup under the set conditions, and when the auto setup is completed, the normal control is in an executable state (step 17).

When the control unit 33A determines in step 12 described above that the manual operation is determined, the control unit 33A waits until the operation unit 310 or the switch 37 is operated by the user.

When the user operates the operation unit 310, the processing proceeds to step 14*b*, and the control unit 33A performs the setting related to the auto setup operation or other settings on the basis of the operation of the operation unit 310.

In the present embodiment, the push-in amount (1 mm) and the stroke (10 mm) are set using the operation unit 310 and stored in the storage unit 35.

Thereafter, in step 15*b*, when the user instructs execution of the auto setup using the operation unit 310 (second communication), the control unit 33A executes the auto setup under the set conditions (step 16).

Further, when an instruction is given to execute the auto setup using the operation unit 310 before the predetermined setting using the operation unit 310 is made in step 14*b*, step 14*b* may be skipped and step 15*b* may be performed. In this case, the predetermined settings are preferably stored in the storage unit 35 in advance at the time of shipment of the device from the factory.

After the control unit 33A determines in step 12 described above that the manual operation is determined, when the user operates the auto setup button 375 of the switch 37, the control unit 33A instructs execution of the auto setup (step 15*c*), and the auto setup is executed (step 16).

In this case, since the user cannot perform the setting related to the auto setup operation using the switch 37 or the like after the manual operation is determined, the necessary settings (the push-in amount (1 mm) and the stroke (10 mm)) are preferably stored in the storage unit 35 in advance at the time of shipment of the actuator 2A from the factory.

Next, an operation of the auto setup of the present embodiment will be described in detail with reference to FIG. 16.

For example, in the present embodiment, as illustrated in FIG. 16, the valve body 76 is stopped at the start position (8 mm) before the auto setup is executed. As described above, the push-in amount (1 mm) and the stroke (10 mm) are set as the setting related to the auto setup operation.

When the auto setup is executed, the control unit 33A starts the first control to move the position of the valve body 76 from the start position (8 mm) to the seat surface position (15 mm). When it is assumed that the valve body 76 reaches the lower maximum position (18 mm) without stopping at a position above the lower maximum position, an abnormality is suspected and error handling is performed. As the error handling, processing of stopping the driving of the valve body 76 (the drive part 50), processing of sounding a warning buzzer (not illustrated), or the like can be exemplified.

When the valve body 76 stops above the lower maximum position (18 mm), the control unit 33A stores the stop position in the storage unit 35 as the first reference position. In the present embodiment, the stop position is at the seat surface position (15 mm).

Thereafter, the control unit 33A controls so that the valve body 76 (the drive part 50) stops at the upper stop position (5 mm). When it is assumed that the valve body 76 (the drive part 50) stops before reaching the upper stop position (5 mm), an abnormality is suspected and error handling is performed.

After detecting that the valve body 76 has reached the upper stop position (5 mm), the control unit 33A starts the second control to move the valve body 76 downward. When it is assumed that the valve body 76 (the drive part 50) stops before reaching the seat surface position (15 mm), an abnormality is suspected and error handling is performed. Error handling is also performed when the valve body 76 reaches the lower maximum position (18 mm) without stopping at a position above the lower maximum position.

When the control unit 33A detects that the valve body 76 has stopped at the same position as the seat surface position (15 mm) or at a position below the seat surface position and above the lower maximum position (18 mm), the control unit 33A stores the stop position in the storage unit 35 as the second reference position. In the present embodiment, the stop position is at the lower stop position (15.1 mm).

Thereafter, the control unit 33A drives the valve body 76 toward a completion position and detects that the valve body 76 has reached the completion position, and then the normal control is in an executable state. In the present embodiment, the completion position is a position (10 mm) that is moved upward by ½ of the stroke (10 mm) from the seat surface position (15 mm). In the embodiment illustrated in FIG. 16, the position of the valve body 76 is set as the completion position, but the position of the drive part 50, the position of the moving part 60, or the like may be set (specified) as the completion position.

The normal control to be described later starts from the completion position (10 mm). A method of setting the completion position is arbitrary, and the completion position (10 mm) may be directly input using, for example, the operation unit 310, the signal processing device 391 (first communication), or the like as a matter of course.

Next, the normal control performed after completion of the auto setup will be described with reference to FIG. 15. Even in the normal control, control of various types can be performed only when a detailed setting of the first communication is set to a predetermined setting. This is for preventing malfunction due to a careless mistake of the user.

As described above, when step 16 (auto setup) of FIG. 14 is completed, the normal control is in an executable state (step 17), the user operates the manual operation button 376 to set the manual operation mode or the non-manual operation mode.

When the control unit 33A determines in step 21 of FIG. 15 that the manual operation mode is set, the processing proceeds to step 27, and when it is determined that the manual operation mode is not determined (the non-manual operation is determined), the processing proceeds to step 22.

In step 27, the control unit 33A automatically sets the detailed setting of the first communication to the "perform monitoring using first communication." In step 28, when the user operates the switch 37 or the operation unit 310, the control unit 33A performs a predetermined operation.

For example, in the present embodiment, the user can perform a control (axial operation) for driving the drive part 50 to an upper (−X direction side) or lower (+X direction side) position using the upper drive button 378a, the lower drive button 378b, or the operation unit 310.

When it is determined in step 21 that the non-manual operation is set, the user selects the first communication (Modbus communication) or the second communication (current signal of 4 mA to 20 mA) using the signal processing device 391. When the control unit 33A determines that the first communication (Modbus communication) is selected, the processing proceeds to step 23, and when the control unit 33A determines that the second communication (current signal of 4 mA to 20 mA) is selected, the processing proceeds to step 25.

In step 23, the user performs the detailed setting of the first communication. When the detailed setting of the first communication is set to the "perform axial operation using first communication," the processing proceeds to step 24, and when the detailed setting of the first communication is not set to the "perform axial operation using first communication," an abnormality handling is performed. The abnormality handling is, for example, a control of stopping the drive part 50.

In step 24, the control unit 33A performs the normal control (axial operation) for driving the drive part 50 to an upper (−X direction side) or lower (+X direction side) position on the basis of the first operation signal S11 of the first communication (the signal processing device 391).

In step 25, the user performs the detailed setting of the first communication. When the control unit 33A determines that the detailed setting of the first communication is set to the "perform monitoring using first communication," the processing proceeds to step 26, and when the control unit 33A determines that the detailed setting of the first communication is not set to the "perform monitoring using first communication," an abnormality handling is performed. In step 26, the control unit 33A performs the normal control (axial operation) for driving the drive part 50 to an upper (−X direction side) or lower (+X direction side) position on the basis of the second operation signal S12 of the second communication (the control device 392).

In the present embodiment, as illustrated in FIG. 13, when the first communication mode is set, the axial operation can be performed only when the "perform axial operation using first communication" is set, and the axial operation cannot be performed using the first communication in other settings.

In this case, even if a control signal is supplied from any of the second communication (the control device 392), the switch 37, and the operation unit 310, the normal control is not performed, and thereby a malfunction that the user does not intend can be prevented.

In the present embodiment, when the second communication mode is set, monitoring can be performed using the first communication and the axial operation can be performed using the second communication only when the "perform monitoring using first communication" is set, and the axial operation cannot be performed using the second communication in other settings. In this case, even if a control signal is supplied from any of the first communication (the signal processing device 391), the switch 37, and the operation unit 310, the normal control is not performed, and thereby a malfunction that the user does not intend can be prevented.

In the present embodiment, when the manual operation mode is determined (not determined to be the non-manual operation), the user can perform the normal control using the upper drive button 378a or the lower drive button 378b of the switch 37. In this case, since the fluid control device does not perform the normal control even if a control signal is supplied from either the first communication (the signal processing device 391) or the second communication (control device 392), a malfunction that the user does not intend can be prevented.

In the present embodiment, when the non-manual mode (not determined to be the manual operation) and a setting mode are set, a set operation (auto setup, setting change, or the like) by the first communication is allowed while an operation by the second communication or the manual operation is not allowed, and thereby a malfunction that the user does not intend can be prevented.

Fourth Embodiment

FIG. 17 is a view for explaining information stored in a storage unit of a fluid control device of a fourth embodiment. In the following description, components the same as those illustrated in FIGS. 1 to 16 will be denoted by the same reference signs and description thereof will be omitted.

In the present embodiment, the information illustrated in FIG. 17 is stored in a storage unit 35 (see FIG. 11) of a control unit 33A (see FIG. 11) of the fluid control device. Further, FIG. 17 is an example of the information stored in the storage unit 35, and the present invention is not limited thereto.

In FIG. 17, the "DATE [year/month/day]" and the "TIME [hour/minute/second]" are information on the date and time when the information is stored. Specifically, information stored at 8:16 on Jan. 14, 2020, 8:16 on Jan. 15, 2020, and 8:17 on Jan. 15, 2020 is exemplified in FIG. 17. In the present embodiment, information is stored at 1-minute intervals, and illustration of information from 8:17 on January 14 to 8:15 on January 15 is omitted in FIG. 17.

The "INTEGRATED ENERGIZATION TIME [hour]" is the integrated time during which a power button 371 is in an ON state, and the "INTEGRATED OPERATION TIME [hour]" is the integrated time during which at least one of a mechanism unit 34 and a drive part 50 is driven. The "INTEGRATED OPERATION DISTANCE [m]" is the integrated distance moved by the drive part 50, a moving part 60, or a valve body 76.

The "NUMBER OF TIMES OF MOTOR START [times]" is the integrated number of times a motor of the mechanism unit 34 or the drive part 50 is started, the "NUMBER OF TIMES OF MOTOR REVERSAL [times]" is the integrated number of times a drive direction of the motor of the mechanism unit 34 or the drive part 50 is reversed, and the "NUMBER OF TIMES OF MOTOR RETRY [times]" is the integrated number of times the motor is started after the mechanism unit 34, the drive part 50, the moving part 60, or the valve body 76 has abnormally stopped.

The "OPERATION RATIO OF EVERY 1 MINUTE [%]" is "time [seconds] during which the motor is driven in past one minute"/60 [seconds]×100[%].

The "NUMBER OF TIMES OF EXCESSIVELY FREQUENT OPERATIONS [times]" is the integrated number of times an excessively frequent operation is performed. The excessively frequent operation refers to, for example, an operation in which the motor is started and stopped in a short period of time. In the present example, for example, an operation with a duty of less than 50% is regarded as the excessively frequent operation.

The "RATIO OF OPENING DEGREE LESS THAN 25% [%]" is "time [hour] during which the opening degree is less than 25%"/integrated energization time [hour]×100[%], the "RATIO OF OPENING DEGREE OF 25% TO 50% [%]" is "time [hour] during which the opening degree is 25% to 50%"/integrated energization time [hour]×100[%], the "RATIO OF OPENING DEGREE OF 50% TO 75% [%]" is "time [hour] during which the opening degree is 50% to 75%"/integrated energization time [hour]×100[%], and the "RATIO OF OPENING DEGREE OF 75% OR MORE [%]" is "time [hour] during which the opening degree is 75% or more"/integrated energization time [hour]×100[%].

The "LOCK INFORMATION [0-2]" is information on a lock state of the motor. 0 is stored in a normal state, 1 is stored when the motor is locked when the motor is driven to drive the drive part 50 to a position on an upper side (−X direction side), and 2 is stored when the motor is locked when the motor is driven to drive the drive part 50 to a position on a lower side (+X direction side).

Since the storage unit 35 is connected to a microcomputer or the like of the control unit 33A, the information illustrated in FIG. 17 is processed by the microcomputer as needed. The microcomputer may further optimize the auto setup control or the normal control by processing the information shown in FIG. 17 and may use the information shown in FIG. 17 to diagnose a failure of a fluid control device 1A. Also, the microcomputer may output the information shown in FIG. 17 from a first terminal 381 to a signal processing device 391 to perform a failure diagnosis of the fluid control device 1A using the signal processing device 391.

Specifically, for example, the microcomputer of the control unit 33A can determine whether or not a control of the microcomputer (for example, PID control (Proportional Integral Derivative Control, PID Controller)) is appropriate on the basis of the number of times of motor start [times] or the number of times of motor reversal [times] to automatically adjust parameters of the control. This is because the number of times of motor start or the number of times of motor reversal increases when the parameters of the control are inappropriate.

Also, for example, it may be determined whether or not the control is appropriate by associating the information of the year/month/day with the information of the number of times of motor start or the number of times of motor reversal. This is because, if the number of times of motor start or the number of times of motor reversal increases as the date gets newer, it can be determined as an abnormality due to aging deterioration.

The microcomputer of the control unit 33A may determine whether or not the control of the microcomputer is appropriate on the basis of the ratio [%] of the opening degree to automatically adjust parameters of the control. This is because there is a likelihood that parameters of the control are abnormal when a time with a predetermined opening degree is abnormal.

The microcomputer of the control unit 33A may analyze the number of times of motor retry, the operation ratio of every 1 minute, the number of times of excessively frequent operations, the lock information, or the like and may notify an abnormality of the device using a notification means (not illustrated) such as a display. This is because the operation ratio of every 1 minute, the number of times of excessively frequent operations, the lock information, or the like includes information useful for determining an abnormality.

The microcomputer of the control unit 33A may notify the replacement time of parts of the device using the integrated energization time, the integrated operation time, or the like. This is because these pieces of information include information useful for determining the replacement time of the parts or the like.

The configurations of the above-described embodiments can be combined with each other. Although various embodiments and modified examples have been described above, the present invention is not limited to these contents. For example, a combination of the configurations of the above-described embodiments with each other, and other aspects conceivable within the scope of the technical idea of the present invention are also included within the scope of the present invention.

INDUSTRIAL APPLICABILITY

According to the present invention, it is possible to provide an actuator and a fluid control device in which a suitable control can be realized.

REFERENCE SIGNS LIST

32 Detection unit
33A Control unit
40 Elastic part
50 Drive part
60 Moving part
35 Storage unit
37 Switch

The invention claimed is:

1. An actuator comprising:
a control unit configured to allow a first control capable of driving a drive part with a first driving force and a second control capable of driving the drive part with a second driving force which is stronger than the first driving force;
a moving part configured to move in a predetermined direction;
an elastic member configured to receive at least one of the first driving force and the second driving force from the drive part and to supply a force for the moving part to move to the moving part; and
a storage unit configured to store an amount of movement by which the drive part is caused to move by the second control in order to realize retightening a valve device, wherein
the control unit starts a driving of the drive part by the first control, then ends the first control when the driving of the drive part has stopped, and causes the storage unit to store a predetermined position which is apart from a position, at which the drive part stops under the first control, by the amount of movement of the drive part along a direction in which the drive part is driven under the first control, and
the control unit drives the drive part by the second control to the predetermined position stored in the storage unit to retighten the valve device.

2. The actuator according to claim 1, wherein the control unit performs control, after storing the predetermined position in the storage unit, using the predetermined position stored in the storage unit and an external control signal supplied externally.

3. The actuator according to claim 1, wherein the amount of movement stored in the storage unit is stored in the storage unit before the control unit performs the first control.

4. The actuator according to claim 1, wherein a length of the elastic member when the control unit performs the first control is larger than a length of the elastic member when the control unit performs the second control.

5. The actuator according to claim 4, wherein a length of the elastic member before the control unit starts the first control is equal to a length of the elastic member when the control unit performs the first control.

6. A fluid control device using the actuator according to claim 1.

7. An actuator comprising:
a control unit configured to allow a first control capable of driving a drive part with a first driving force and a second control capable of driving the drive part with a second driving force which is stronger than the first driving force;
a moving part configured to move in a predetermined direction;
an elastic member configured to receive at least one of the first driving force and the second driving force from the drive part and to supply a force for the moving part to move to the moving part; and
a storage unit configured to store an end condition for ending the second control, wherein
the control unit starts a first driving of the drive part by the first control, then starts a second driving of the drive part by the second control when the first driving of the drive part has stopped, and
the control unit causes the storage unit to store positional information of the drive part as first positional information when the end condition stored in the storage unit has been satisfied, wherein the end condition is an elapse time elapsed since starting of the second control, and
the control unit ends the second control when the elapse time has elapsed since starting of the second control and causes the storage unit to store the positional information of the drive part as the first positional information when the second control has ended.

8. A method of operating an actuator including a control unit configured to allow a first control capable of driving a drive part with a first driving force and a second control capable of driving the drive part with a second driving force which is stronger than the first driving force, a moving part configured to move in a predetermined direction, a spring member configured to receive at least one of the first driving force and the second driving force from the drive part and to supply a force for the moving part to move to the moving part, and a storage unit configured to store an amount of movement by which the drive part is caused to move by the second control in order to realize retightening a valve device, the method comprising:
a first step of starting a driving of the drive part by the control unit according to the first control,
a second step of ending the first control by the control unit when the driving of the drive part under the first control has stopped,
a third step of causing the storage unit to store a predetermined position which is apart from a position, at which the drive part stops under the first control, by the amount of movement of the drive part along a direction in which the drive part is driven by the first control, and
a fourth step of retightening the valve device by driving the drive part under the second control to the predetermined position stored in the storage unit.

9. An actuator comprising:
a control unit configured to allow a first control capable of driving a drive part with a first driving force and a second control capable of driving the drive part with a second driving force which is stronger than the first driving force;
a moving part configured to move in a predetermined direction;
an elastic member configured to receive at least one of the first driving force and the second driving force from the drive part and to supply a force for the moving part to move to the moving part; and
a storage unit configured to store an end condition for ending the second control,
wherein
the control unit starts a first driving of the drive part by the first control, then starts a second driving of the drive part by the second control when the first driving of the drive part has stopped, and
the control unit causes the storage unit to store positional information of the drive part as first positional information when the end condition stored in the storage unit has been satisfied
the end condition stored in the storage unit is stored in the storage unit before the control unit performs the first control.

10. An actuator comprising:
a control unit configured to allow a first control capable of driving a drive part with a first driving force and a second control capable of driving the drive part with a second driving force which is stronger than the first driving force;
a moving part configured to move in a predetermined direction;
an elastic member configured to receive at least one of the first driving force and the second driving force from the drive part and to supply a force for the moving part to move to the moving part; and
a storage unit configured to store an end condition for ending the second control,
wherein
the control unit starts a first driving of the drive part by the first control, then starts a second driving of the drive part by the second control when the first driving of the drive part has stopped,
the control unit causes the storage unit to store positional information of the drive part as first positional information when the end condition stored in the storage unit has been satisfied, and
a length of the elastic member when the control unit performs the first control is larger than a length of the elastic member when the control unit performs the second control.

11. An actuator comprising:
a control unit configured to allow a first control capable of driving a drive part with a first driving force and a second control capable of driving the drive part with a second driving force which is stronger than the first driving force;
a moving part configured to move in a predetermined direction;
an elastic member configured to receive at least one of the first driving force and the second driving force from the drive part and to supply a force for the moving part to move to the moving part; and
a storage unit configured to store an end condition for ending the second control,
wherein
the control unit starts a first driving of the drive part by the first control, then starts a second driving of the drive part by the second control when the first driving of the drive part has stopped,
the control unit causes the storage unit to store positional information of the drive part as first positional information when the end condition stored in the storage unit has been satisfied,
a length of the elastic member when the control unit performs the first control is larger than a length of the elastic member when the control unit performs the second control, and
a length of the elastic member before the control unit starts the first control is equal to a length of the elastic member when the control unit performs the first control.

* * * * *